(12) United States Patent
Bartholic et al.

(10) Patent No.: US 12,089,125 B2
(45) Date of Patent: Sep. 10, 2024

(54) MODULAR HARDWARE AND SOFTWARE INTEGRATION FOR ENVIRONMENTAL SENSOR DEVICES

(71) Applicant: GLOBALLY UNIFIED AIR QUALITY, Grand Island, NY (US)

(72) Inventors: Michael William Bartholic, Pittsburgh, PA (US); Colton Michael Padden, Arlington, VA (US); Francois Pascal Girard, Bethesda, MD (US)

(73) Assignee: Globally Unified Air Quality, Grand Island, NY (US)

( * ) Notice: Subject to any disclaimer, the term of this patent is extended or adjusted under 35 U.S.C. 154(b) by 421 days.

(21) Appl. No.: 17/385,745

(22) Filed: Jul. 26, 2021

(65) Prior Publication Data
US 2022/0030402 A1   Jan. 27, 2022

Related U.S. Application Data

(60) Provisional application No. 63/103,250, filed on Jul. 24, 2020.

(51) Int. Cl.
*G06F 8/71* (2018.01)
*G06F 13/40* (2006.01)
(Continued)

(52) U.S. Cl.
CPC .............. *H04W 4/70* (2018.02); *G06F 8/71* (2013.01); *G06F 13/409* (2013.01);
(Continued)

(58) Field of Classification Search
CPC .............. H04L 63/105; H04L 43/0876; H04L 41/0631; H04L 45/48; H04L 43/062; H04W 88/08; H04W 8/02; H04W 4/029
See application file for complete search history.

(56) References Cited

U.S. PATENT DOCUMENTS 8,779,921 B1   7/2014 Curtiss
2005/0275528 A1   12/2005 Kates
(Continued)

FOREIGN PATENT DOCUMENTS

WO   WO-2022020813 A1   1/2022

OTHER PUBLICATIONS

International Search Report and Written Opinion of the International Searching Authority for International Application No. PCT/US2021/043227, dated Oct. 26, 2021, 11 pages.
(Continued)

*Primary Examiner* — Iqbal Zaidi
(74) *Attorney, Agent, or Firm* — COOLEY LLP

(57) ABSTRACT

An apparatus includes a housing enclosing a microcontroller and multiple sensors. The microcontroller automatically detects a system status of the apparatus and selects at least one of a network interface from a set of network interfaces or a communications protocol from a set of communications protocols, based on the system status. The microcontroller also receives measurements from each of the sensors. In response to detecting an anomaly among the measurements, an anomaly message is generated and broadcast to at least one peer compute device via the selected at least one of the network interface or the communications protocol, and a signal representing the measurements is generated and wirelessly transmitted to a remote compute device. In response to not detecting an anomaly among the plurality of measurements, a signal representing the plurality of measurements is generated and wirelessly sent to the remote compute device.

22 Claims, 20 Drawing Sheets

(51) Int. Cl.
*G06F 13/42* (2006.01)
*H04W 4/20* (2018.01)
*H04W 4/38* (2018.01)
*H04W 4/70* (2018.01)
*H04W 4/80* (2018.01)

(52) U.S. Cl.
CPC .......... *G06F 13/4282* (2013.01); *H04W 4/20* (2013.01); *H04W 4/38* (2018.02); *H04W 4/80* (2018.02)

(56) References Cited

U.S. PATENT DOCUMENTS

| | | |
|---|---|---|
| 2008/0094210 A1 | 4/2008 | Paradiso et al. |
| 2011/0248846 A1 | 10/2011 | Belov et al. |
| 2016/0072832 A1 | 3/2016 | Kim |
| 2018/0124087 A1* | 5/2018 | Shi .................. H04W 24/08 |
| 2020/0042741 A1* | 2/2020 | Difrancesco ........ H04L 63/0407 |
| 2022/0131699 A1* | 4/2022 | Kimmel .............. H04L 63/0861 |

OTHER PUBLICATIONS

International Preliminary Report on Patentability for International Application No. PCT/US2021/043227, dated Jan. 24, 2023, 9 pages.

* cited by examiner

MODULAR HARDWARE AND SOFTWARE INTEGRATION FOR ENVIRONMENTAL SENSOR DEVICES

CROSS-REFERENCE TO RELATED APPLICATIONS

This application claims priority to and the benefit of U.S. Provisional Patent Application No. 63/103,250, filed Jul. 24, 2020 and titled "Novel Modular Hardware and Software Integration for Environmental Sensor Devices," the disclosure of which is incorporated by reference herein in its entirety.

TECHNICAL FIELD

The present disclosure relates generally to sensor technologies, and in particular to sensor systems that employ Internet of Things (IoT) devices for measuring physical phenomena within an environment.

BACKGROUND

The Internet of Things (IoT) refers to a network of physical objects that are embedded with sensors, software, and other technologies for the purpose of connecting and exchanging data with other devices and systems, for example over a network.

SUMMARY

In some embodiments, an apparatus includes a housing enclosing a microcontroller and multiple sensors. The microcontroller includes a processor and a memory operatively coupled to the processor. The memory stores instructions that, when executed by the processor, cause the processor to automatically detect a system status of the apparatus and select at least one of a network interface from a set of network interfaces or a communications protocol from a set of communications protocols, based on the system status. The memory also stores instructions to cause the processor to receive a representation of a measurement from each sensor of at least a subset of sensors from the plurality of sensors, collectively defining a plurality of measurements. The memory also stores instructions to cause the processor to, in response to detecting an anomaly among the plurality of measurements: generate a message indicating the anomaly, for transmission to at least one peer compute device, cause the message to be broadcast to the at least one peer compute device via the selected at least one of the network interface or the communications protocol, and generate a signal representing the plurality of measurements to be sent, via a wireless network, to a remote compute device. The memory also stores instructions to cause the processor to, in response to not detecting an anomaly among the plurality of measurements, generate a signal representing the plurality of measurements to be sent, via the wireless network, to the remote compute device.

In some embodiments, a method includes automatically detecting, via a processor, a system status of an apparatus including a microcontroller and a plurality of sensors disposed within a housing, and selecting, via the processor, at least one of a network interface from a plurality of network interfaces or a communications protocol from a plurality of communications protocols, based on the system status and at least one of: a predefined application, a power availability, or a predefined battery life. A representation of a measurement is received via the processor from each sensor of at least a subset of sensors from the plurality of sensors, collectively defining a plurality of measurements. In response to detecting an anomaly among the plurality of measurements, the processor generates a message indicating the anomaly, for transmission to at least one peer compute device, causes the message to be broadcast to the at least one peer compute device via the selected at least one of the network interface or the communications protocol, and generates a signal representing the plurality of measurements to be sent, via a wireless network, to a remote compute device. In response to not detecting an anomaly among the plurality of measurements, the processor generates a signal representing the plurality of measurements to be sent, via the wireless network, to the remote compute device.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
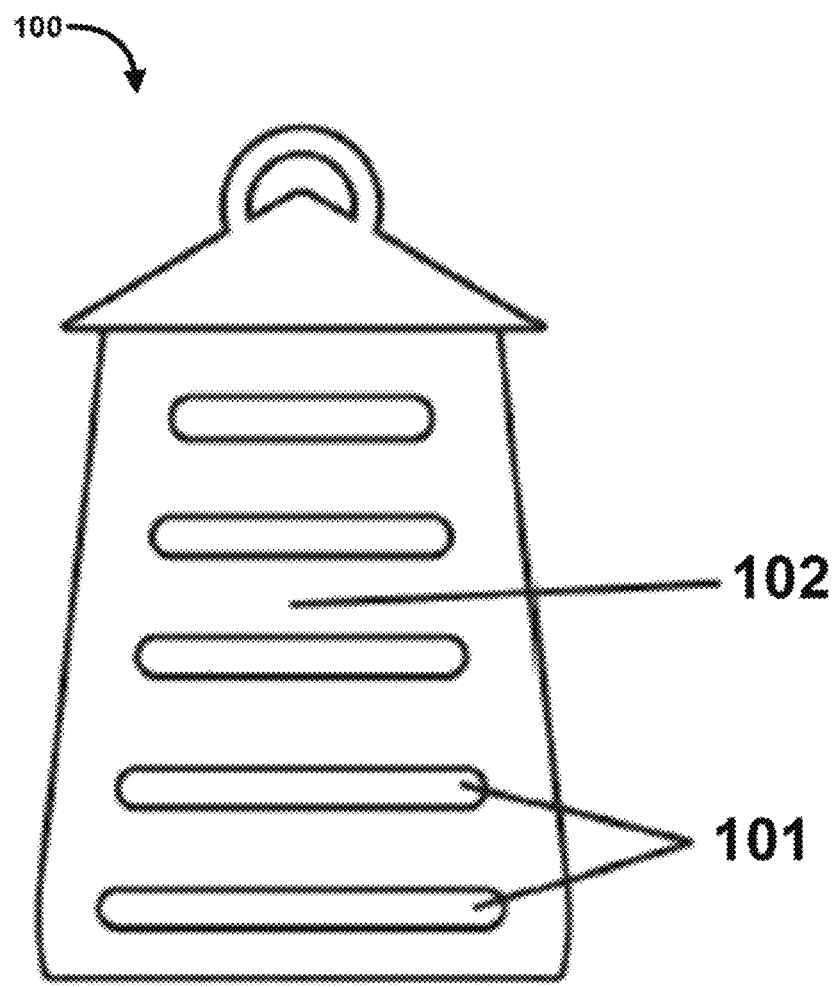
FIGS. 1-3 show components of a modular design for an example environmental sensor apparatus, according to some embodiments.

The present disclosure describes systems, apparatuses, and methods for monitoring environmental conditions by leveraging multiple Internet of Things (IoT) devices (e.g., sensors) that are embedded within, attached to, housed by, and/or in communication with an extensible IoT device platform (collectively referred to herein as an "environmental sensor apparatus"). According to some embodiments, the environmental sensor apparatuses described herein are "modular," in that they are designed for the selective insertion/attachment and removal of new sensors (or sensor assemblies) without a redesign of the overall environmental sensor apparatus or the software and/or hardware embedded therein, such that users can customize their environmental sensor apparatuses based on their needs and/or preferences. Such customizations can include adding or removing sensors, upgrading sensors, etc. In some implementations, existing sensors and/or existing electronic components, as well as newly-installed sensors and/or electronic components, are automatically recognized by software onboard the environmental sensor apparatus. Alternatively or in addition, environmental sensor apparatuses described herein can include one or more software subsystems configured to perform device state management (e.g., sensor status monitoring) and advanced dynamic operations, as further discussed below.

In some embodiments, an environmental sensor apparatus can accommodate the insertion or attachment of additional hardware that is automatically detected by onboard software and rendered operational by the onboard software. In addition, the environmental sensor apparatus can be configured to perform software-defined behaviors for a variety of different use cases. For example, the environmental sensor apparatus can include a subsystem for detecting, registering, and communicating with one or more modular devices (e.g., sensors and/or other electronic components), where the one or more modular devices can include modular devices installed within the housing of the environmental sensor apparatus (e.g., via an electronics assembly thereof) and/or modular devices that are external to the environmental sensor apparatus but in communication (e.g., via a wired network and/or a wireless network) with the electronics assembly of the environmental sensor apparatus. The subsystem (implemented in hardware and/or software) for detecting, registering, and communicating with the one or more modular devices is referred to herein as the Internet of Things ("IoT") interfaces module. The IoT interfaces module can facilitate the detection and utilization of external and internal hardware devices in an extensible manner, and can work in conjunction with an IoT calendar software module configured to register available tasking information and provide access to a logical mapping (e.g., stored in memory and/or accessed via communication with one or more remote compute devices) between software operations and hardware interfaces. The IoT calendar software can serve as a "patching" layer between optional expansion modules and the software that drives them, and may be configured to communicate with all internal and external hardware interfaces, using any of a variety of data protocols.

In some embodiments, an environmental sensor apparatus includes a subsystem (implemented in hardware and/or software) for receiving and implementing highly efficient Over-The-Air (OTA) firmware updates (referred to herein as the IoT updater module). In some implementations, the IoT updater module can remotely update one or more devices (e.g., sensors) onboard the environmental sensor apparatus to support new hardware that may have been introduced after the environmental sensor apparatus was designed and/or manufactured, without modifying the environmental sensor apparatus itself. Alternatively or in addition, the IoT updater module can receive and implement software support for one or more of the devices (e.g., sensors) onboard the environmental sensor apparatus. The IoT updater module can be configured to perform, for example, a process for in-memory OTA firmware updates, as shown and described below with reference to FIG. 10, and/or can be configured to perform a process for compression of OTA firmware updates on exceptionally highly constrained data networks, as shown and described below with reference to FIG. 11. The IoT updater module can also maintain "fallback" storage utilization and file copying firmware update functionalities (or "operating modes") that can be used when a determination is made that one or more preconditions for other more advanced storage utilization and/or file copying firmware update functionalities are not met, or when the benefits of utilizing such advanced functionalities are unlikely to be realized (e.g., due to increased computational time). The fallback storage utilization and file copying firmware update operating modes may be less time consuming and/or less computationally intensive than the advanced versions thereof.

In some embodiments, an environmental sensor apparatus includes a subsystem (implemented in hardware and/or software) for dynamic network selection (referred to herein as the IoT networking module). The IoT networking module can function in conjunction with the IoT calendar module to convey stimulus and/or to select interfaces to use based on a given task or set of tasks. In some implementations, the IoT networking module supports contextual awareness and a wide range of operating conditions, in that interfaces may be selected (e.g., automatically or based on a user input) dynamically, for a variety of different environments and applications. The IoT networking module can be configured to perform, for example, a process for adaptable/dynamic IoT device behavior based on one or more neighboring peer devices, as shown and discussed below with reference to FIG. 7, and/or can be configured to perform a process for network interface selection on an IoT device based on interface availability and contextual stimuli, as shown and discussed below with reference to FIG. 9. In some implementations, the IoT networking module maintains static offloading procedures for when advanced offloading processes are not desired or are not advantageous. The fallback offloading processes may be less time consuming and/or less computationally intensive than the advanced versions thereof.

In some embodiments, an environmental sensor apparatus includes a subsystem (implemented in hardware and/or software) for dynamic tasking and runtime operation (referred to herein as the IoT calendar module). In some implementations, the IoT calendar module facilitates extensible hardware functionalities that are backed by updatable software functionalities to drive them. Additionally, the IoT calendar module can be used to dynamically "tune" device operation to a selected operating mode or set of operating instructions, from a plurality of operating mode options or sets of operating instructions, to target one or more behaviors that are more suitable for a given environment or application. The IoT calendar module can be configured to perform, for example, a process for dynamic data caching and data offload, as shown and described below with reference to FIG. 5, and/or can be configured to perform a process for dynamic task scheduling for an IoT device with runtime loop, as shown and described below with reference to FIG. 6.

In some embodiments, an environmental sensor apparatus includes an interface for mechanical connections and electrical connections, including one or more bi-directional data interfaces for reading data from and writing data to other compute devices. Optionally, the environmental sensor apparatus can support modules that are "semi-permanent" or temporary, and/or that communicate in a manner other than via the interfaces of the expansion module. Optionally, the environmental sensor apparatus can support some functionalities on only a subset of the module interfaces, can allow modules to support/implement only their individually associated subset of interfaces features used to function, can support non-sensor module types including (but not limited to) electronic paper ("E-Paper") displays, antennas, etc., can support modules that occupy more than a single "module slot," and/or can be compatible with a variety of different types of modules with a variety of different enclosure properties (e.g., size, shape, connector type, power requirements, communications protocols, signaling protocol, etc.).

In some implementations, the environmental sensor apparatus does not prevent the inclusion of modules that are semi-permanent fixtures (e.g., by having the modules that are semi-permanent fixtures communicate solely through the expansion modules' interfaces). Alternatively or in addition, the environmental sensor apparatus may not violate the module interface standard in a way that interferes with device platform operation or exceeds specified operating limits.

In some embodiments, some or all IoT devices (e.g., sensors) of the environmental sensor apparatus each has its own design-specific enclosure (e.g., for mechanical and/or electrical protection). Multiple different types of IoT devices and their associated enclosures may be accommodated by/compatible with a module interface of the environmental sensor apparatus, in a variety of configurations, such that the installation and interchange of IoT devices within the environmental sensor apparatus do not conflict or interfere with one another (e.g., electrically or mechanically). In some implementations, the module interface includes: (i) multiple sets of data lines (e.g., for multiple different protocols, including but not limited to Inter-Integrated Circuit (I2C) protocol, a Universal Asynchronous Receiver-Transmitter (UART) protocol, and/or a Serial Peripheral Interface (SPI) protocol), (ii) binary input lines for "switching," (iii) stable electrical ground lines for grounding with/to one or more other components of the environmental sensor apparatus, (iv) connection(s) on the motherboard for input power (e.g., 3.3 V; can be switchable for selective use), and (v) input power (e.g., 5V; can be switchable for selective use).

In some embodiments, an environmental sensor apparatus has a modular design, in that it is extensible (i.e., IoT devices such as sensors can be interchanged/swapped out, and automatically detected and used by the environmental sensor apparatus). In some implementations, the design or configuration of the environmental sensor apparatus includes three logical components: (a) a common device platform to physically support, and to collect measurements from, sensors and/or other IoT devices, (b) sensor carrier modules (e.g., one or more per sensor type) designed to connect to the common device platform and sensor, and (c) one or more sensor units (e.g., from third party suppliers/manufacturers). Although shown and described herein to supports functionality as a "sensor platform," the environmental sensor apparatus is not limited to "sensing" devices, and other types of electronics/IoT devices can also be compatible with the environmental sensor apparatus, making its functionalities highly customizable. Depending on the application and implementation, the environmental sensor apparatus can include one or more of: an internal battery (e.g., rechargeable), a universal serial bus (USB) charging interface (or any other charging interface configured to supply power to the environmental sensor apparatus from an external power supply), one or more solar panels, one or more communication modules (e.g., radio transceiver(s)), one or more dedicated antennas (optionally integrated with the solar module), one or more human interface devices such as graphical user interfaces (GUIs), electronic displays, touchscreens, mechanical or electronic buttons, an E-Ink display, and an external removable data storage.

Figure 2:
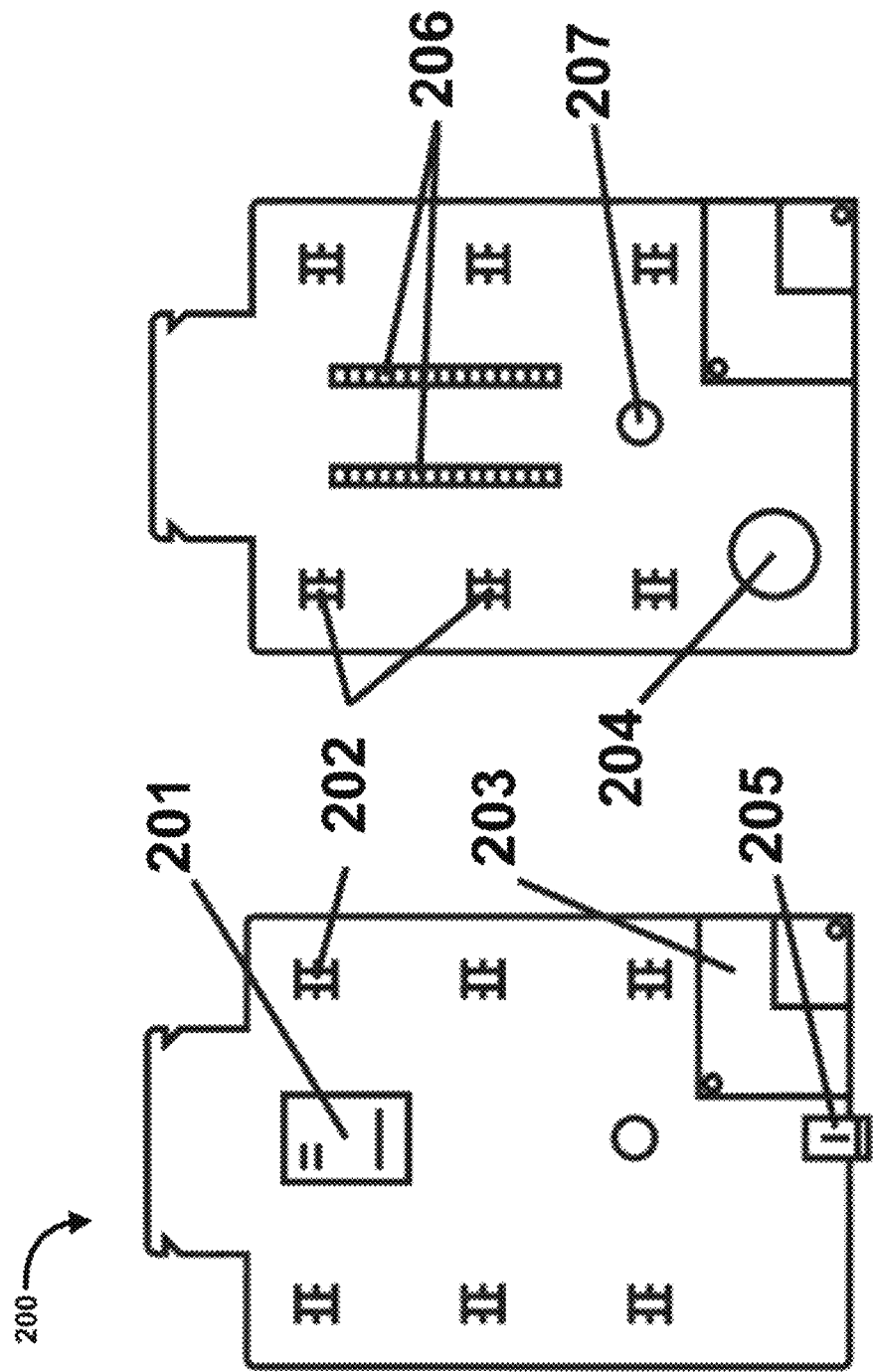
Figure 3:
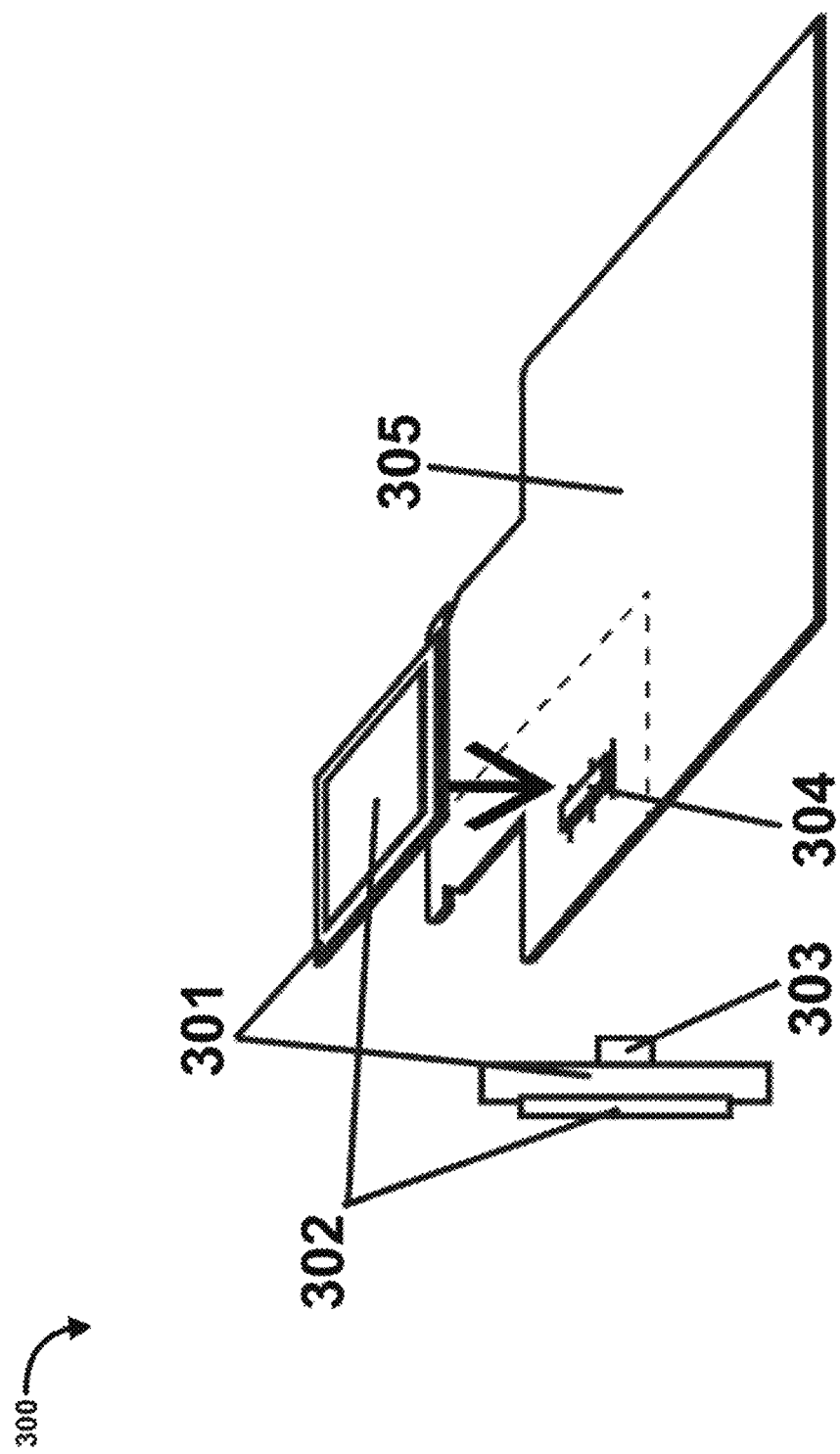

FIGS. 1-3 show components of a modular design for an example environmental sensor apparatus, according to some embodiments. As shown in FIG. 1, the environmental sensor apparatus 100 includes a housing 102 with a plurality of vent openings 101 ("vents") for airflow. The housing 102 can comprise a material that is weather resistant and/or impact resistant, such as plastic or metal.

FIG. 2. shows front (left) and rear (right) faces of an environmental sensor electronics assembly 200 including—a microcontroller (MCU) 201,—a plurality of expansion module interfaces (plug/male side) 202,—a set of integrated core sensors 203 on an internal, non-extensible interface,—an optional backup battery 204 (e.g., for time keeping),—a USB-C power interface 205,—a pair of raised headers 206 configured to mechanically and electrically couple to one or more optional auxiliary modules (e.g., to add networking functionality, a secondary processor, etc.), and a mounting point 207 for mechanical and electrical attachment of one or more optional external antennas. The MCU 201 includes a processor and a memory operably coupled to the processor (e.g., via a common printed circuit board (PCB)), the memory storing processor-executable instructions to perform one or more processes described herein (see, e.g., FIGS. 4-7 and 9-12, and discussions thereof). As shown in FIG. 2, each of the MCU 201, the expansion module interfaces 202, the core sensors 203, the backup battery 204, the USB-C power interface 205, the raised headers 206, and the mounting point 207 of the environmental sensor electronics assembly 200 is attached/affixed to, or defined within, a common substrate (also referred to herein as a "motherboard").

FIG. 3 depicts the insertion/removal of an expansion module 301 onto an environmental sensor electronics assembly substrate or motherboard 305. The expansion module 301 can include a technology "integration layer" (e.g., customized for a user application) to support interactions with components of the environmental sensor electronics assembly (e.g., one or more third party sensors). For example, as shown in FIG. 3, a third party sensor module 302 is included with/integrated into the integration layer of the expansion module 301. The expansion module 301 includes a first expansion module interface connector 303 that is configured to couple to a complementary second expansion module interface 304 on the motherboard 305.

Figure 4:
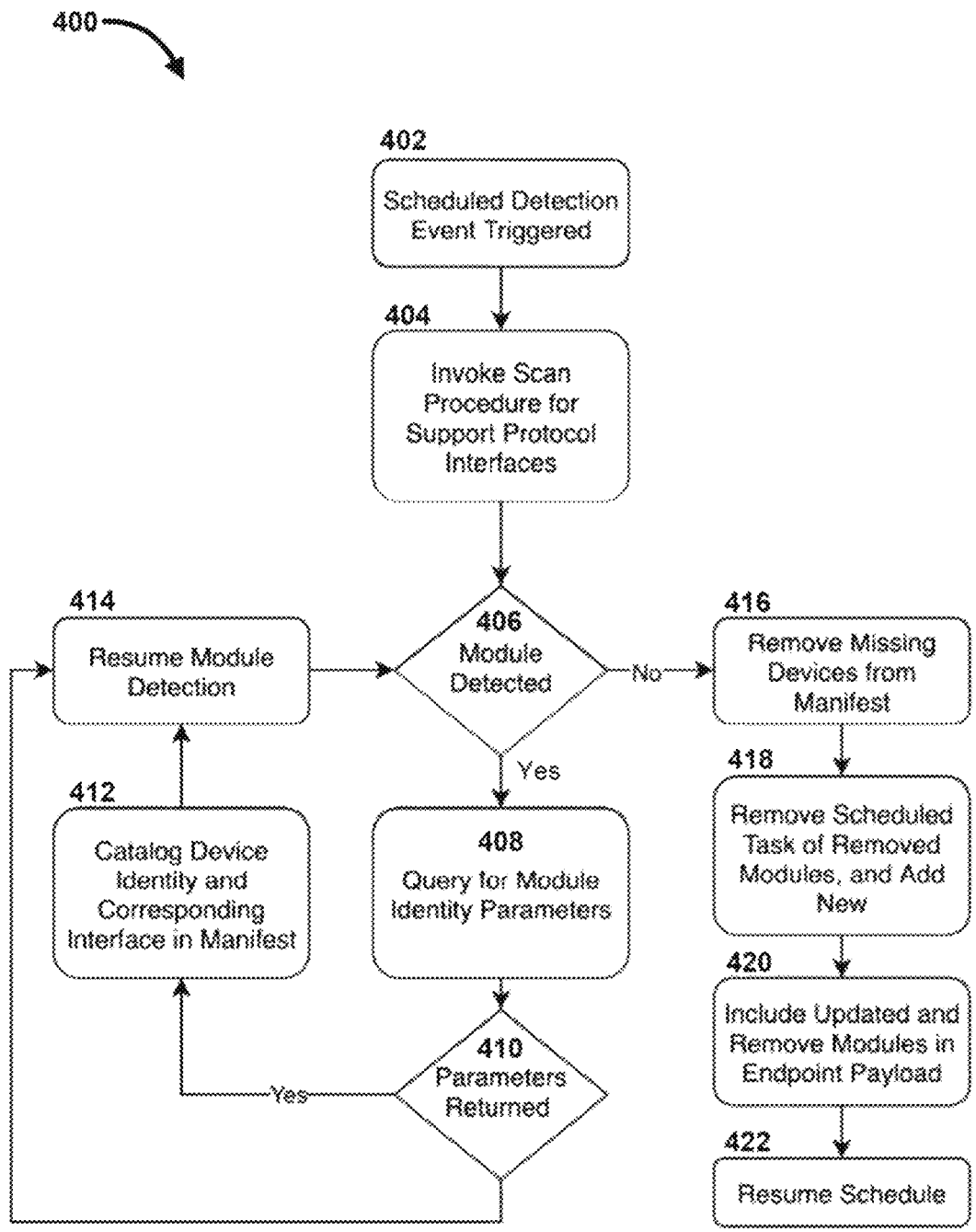
FIG. 4 is a flow diagram showing an auto recognition process for an expandable environmental sensor apparatus, according to some embodiments.

FIG. 4 is a flow diagram showing an auto recognition process 400 for an expandable environmental sensor apparatus, according to some embodiments. The process 400 can be implemented, by way of example, by the environmental sensor apparatus 1300 of FIG. 13. As shown in FIG. 4, the method 400 includes triggering a scheduled detection event, at 402, and invoking a scan for support protocol interfaces at 404. At 406, a determination is made as to whether a module has been detected. If so, the process 400 proceeds to step 408, during which a query for module identity parameters is performed. If parameters are returned (410), a device identity and corresponding interface are catalogued/stored in a manifest at 412. A manifest can refer, for example, to a record in memory. The process 400 then proceeds to step 414, where module detection is resumed. If parameters are not returned at 410 as a result of the query at step 408, the process 400 proceeds directly to step 414, where module detection is resumed. If, at 406, no module is detected, one or more missing devices are removed from the manifest at 416. At 418, any scheduled tasks for removed modules are removed from the manifest and/or from memory, and optionally one or more new scheduled tasks (e.g., for different modules) are added to the manifest and/or memory. Representations of any modules that have been updated, added, and/or removed are included in an endpoint payload at 420, and the process 400 proceeds to resume scheduled tasks at 422.

Figure 5:
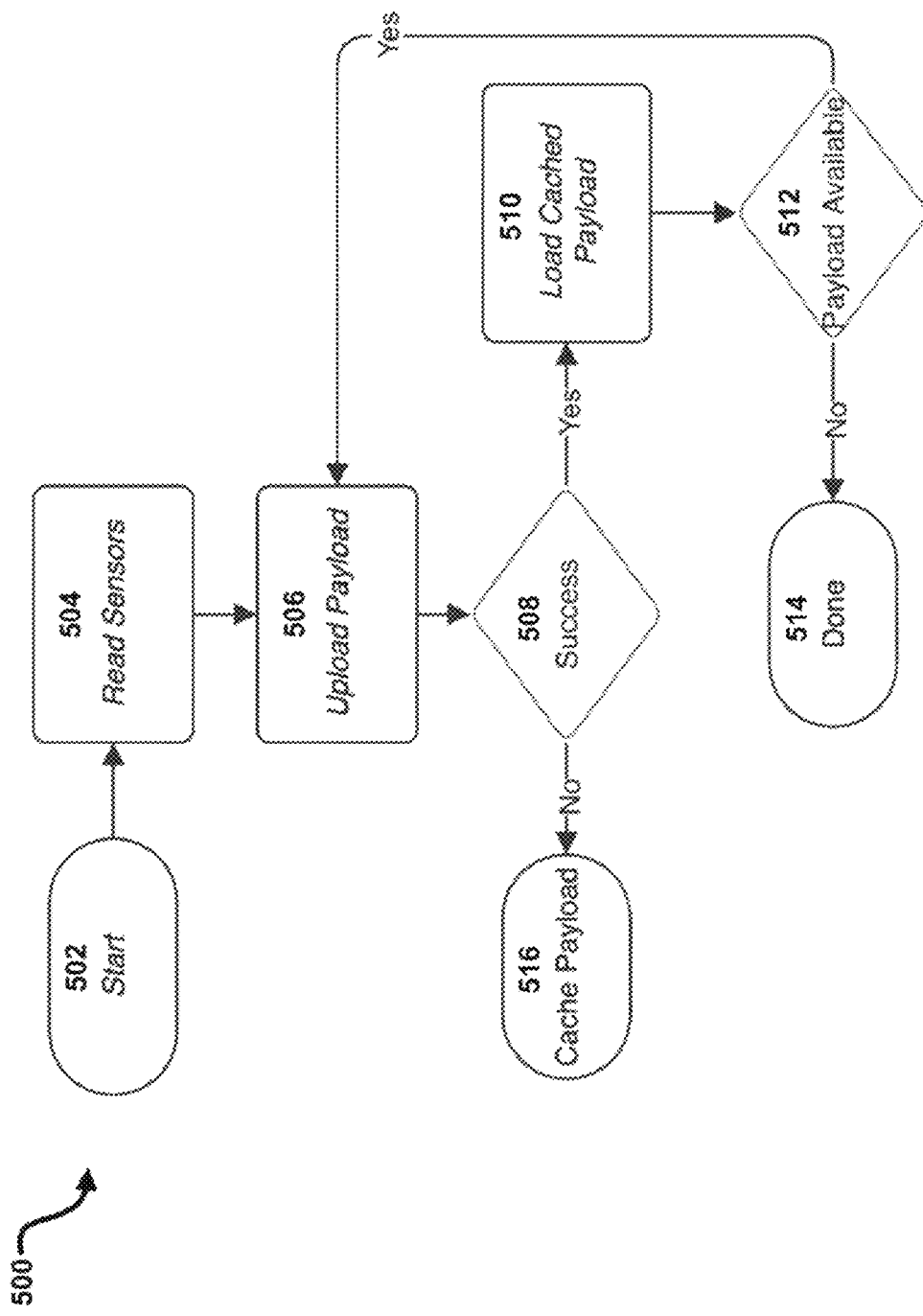
FIG. 5 is a flow diagram showing a cached payload dynamic storage and upload process for an environmental sensor apparatus, according to some embodiments.

FIG. 5 is a flow diagram showing a process 500 for dynamic data caching/storage, data offload, and payload upload, for an environmental sensor apparatus, according to some embodiments. The process 500 can be implemented, by way of example, by the environmental sensor apparatus 1300 of FIG. 13. As shown in FIG. 5, the process 500 starts at 502, and one or more sensors of the environmental sensor apparatus are read at 504. At 506, a payload (e.g., including sensor data from the one or more sensors, or a subset thereof) is uploaded, followed by a determination at 508 as to whether the payload upload was successful. If not, the payload is cached/stored locally at 516. If the payload was successful at 508, then an attempt to load the payload is made at 510. If another payload is determined at 512 to be available, the process 500 loops back to step 506 and another upload of the next payload is performed, and the process continues as described above. If, at 512, no additional payload are available, the process ends (514).

The process 500 of FIG. 5 facilitates uninterrupted data collection without losing data (e.g., due to a lack of a network connection, or when the network is unavailable, or when the environmental sensor apparatus has been taken offline. The process 500 also facilitates data collection and preservation when the environmental sensor apparatus is in motion ("mobile"), when it is computationally advantageous to do so, and/or when the environmental sensor apparatus is located in unstable or underdeveloped network environments.

In some implementations, an environmental sensor apparatus implementing the process 500 of FIG. 5 includes a stable, low-power datastore and/or a stable, low-power method of time keeping (e.g., real-time clock (RTC), time stamp counter, etc.). Alternatively or in addition, the environmental sensor apparatus may include a caching setting that collects and stores data (e.g., from onboard IoT devices) while offline, for a predetermined period of time and/or during predefined time intervals, without attempting to offload the data (e.g., to conserve power, for example when a network connection is not available or is not advantageous, and/or when in a power saving mode). For example, in some implementations, the environmental sensor apparatus can be configured to "learn" and/or predict which intervals of time are expected to be "offline" intervals (e.g., where a network connection is unavailable or undesirable), and collect and store data offline during those identified time intervals without attempting to offload data (e.g., until a time at which network connectivity is predicted, expected, or known to be restored). Alternatively or in addition, the environmental sensor apparatus can be configured to interrupt and resume offloading based on one or more rules, for example to avoid offloading data during long durations time intervals in which no new measurement data has bee-n collected. Alternatively or in addition, the environmental sensor apparatus can be configured to limit a number of retries when an upload fails, and/or can be configured to prohibit modifications to cached/stored measurement data, where such modifications compromise the integrity of, or are not faithful to, the original data content. Note that in such implementations, the addition of metadata to the data records may, however, be permissible.

In some embodiments, depending on the scheduling configuration, the environmental sensor apparatus may be configured to attempt to upload sensor measurement data to one or more network endpoints, (i.e., any device that is physically an end point on a network via which the environmental sensor apparatus communicates) and/or cache the sensor measurement data to internal or external storage (optionally with a timestamp). For example, if there is an unexpected network failure outage when attempting to upload a payload, the environmental sensor apparatus may elect to offload the data to external storage without further attempts to upload the payload. When scheduled, and/or when network connectivity is available, the environmental sensor apparatus may upload (or resume uploading) cached payloads to the network endpoint. The one or more networks endpoint may take further actions with respect to the payloads, for example by caching/storing them (e.g., in a time-series data storage format, such that the payload data is associated with timestamps) in a manner that ensures the preservation of sequential measurements. In some implementations, a regular schedule of sensor measurements and payload processing may be enforced by the environmental sensor apparatus. For example, cache uploading may be paused and resumed when the scheduling becomes misaligned, to ensure adherence to scheduling. If the environmental sensor apparatus is configured for offline use or is operating in an offline mode (e.g., because no upload is currently scheduled and/or because no network connection is available), all sensor measurement data can be offloaded to an external storage of a compute device in a format that facilitates subsequent uploading from the compute device to the one or more network endpoints.

Figure 6:
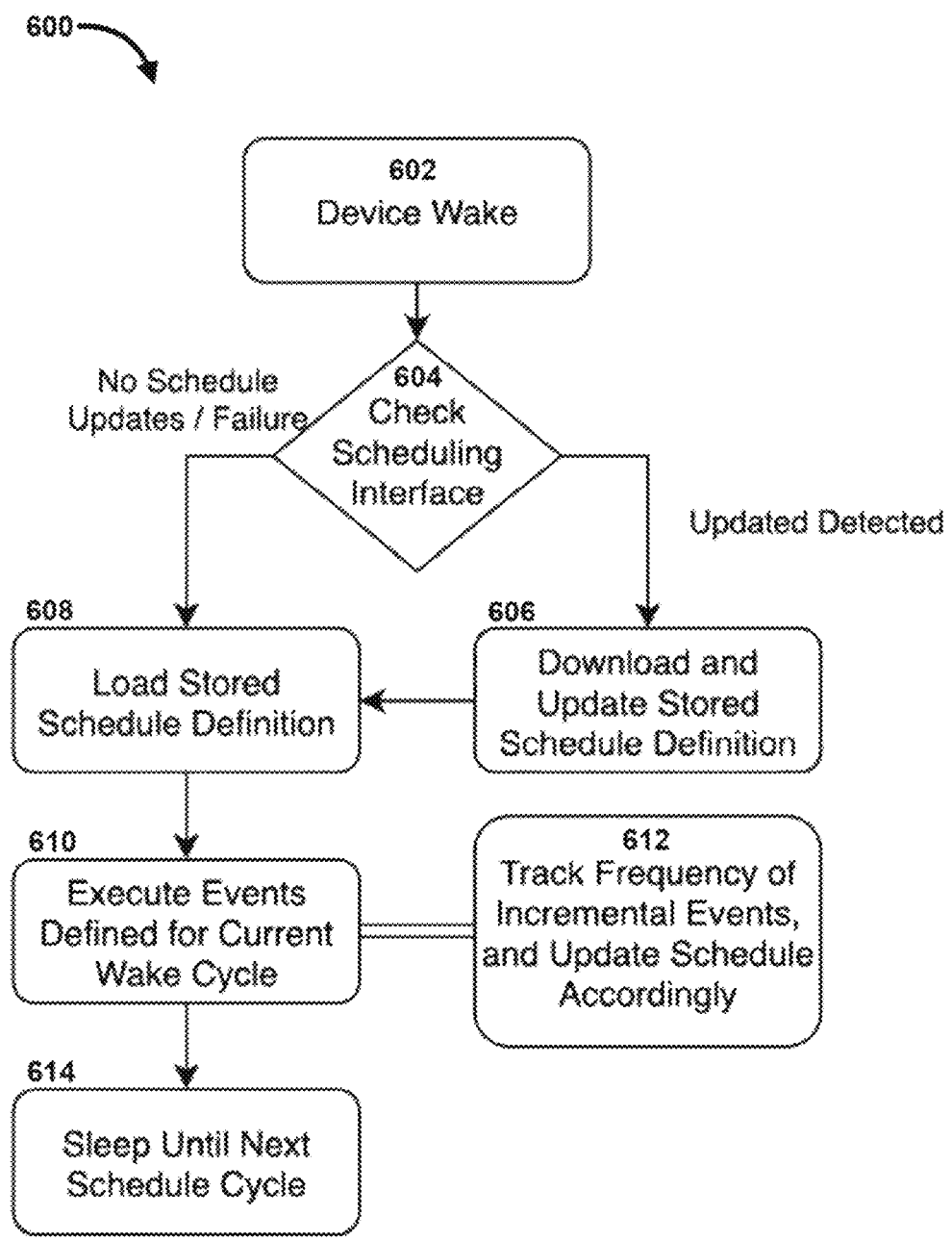
FIG. 6 is a flow diagram showing a process for dynamic task scheduling for an Internet of Things (IoT) device, according to some embodiments.

FIG. 6 is a flow diagram showing a process 600 for dynamic task scheduling for an Internet of Things (IoT) device, with a runtime loop, according to some embodiments. The process 600 can be implemented, by way of example, by the environmental sensor apparatus 1300 of FIG. 13. As shown in FIG. 6, the process 600 includes a device wake event at 602 (i.e., the environmental sensor apparatus transitions from a sleep or offline mode to a wake/active mode), followed by a check of a scheduling interface at 604. The scheduling interface may be stored in a local memory of the environmental sensor apparatus and/or may be stored in a remote compute device. If an update to the schedule is detected at 604 (e.g., as a result of a user-defined scheduling update, or in response to new measurement data and/or alerts), the updated schedule definition is downloaded at 606, and loaded at 608. If no update to the schedule is detected at 604 and/or if a failure of the scheduling interface is detected, a stored schedule definition (without updates) is loaded at 608. At 610, a plurality of events that is defined, by the loaded schedule definition, as being associated with the current wake cycle are executed by the environmental sensor apparatus. Concurrently, at 612, the frequency of incremental events from the plurality of events can be tracked, and the schedule can be updated accordingly (i.e., based on the tracking). After executing the scheduled events at 610, the environmental sensor apparatus can be placed in or returned to a sleep mode, at 614, until a next scheduled cycle.

The process 600 of FIG. 6 facilitates performing predefined, or "default," tasks for a given runtime cycle, and can also accommodate irregular task patterns and customizable runtime cycles. Each task may be performed/run at its own scheduled frequency. This functionality allows for dynamic adaptations of task scheduling within the environmental sensor apparatus based on stimuli that may include user input(s), sensor measurements, device status changes, alerts, etc. Highly complex and advanced functionality can thus be achieved in a relatively low resource IoT device, without detracting from the overall performance of the IoT device and/or the environmental sensor apparatus. Dynamic scheduling can result in increased efficiency operation (as contrasted with static scheduling) in that the environmental sensor apparatus only executes tasks that are deemed critical at any given point in time.

In some implementations, an environmental sensor apparatus implementing the process 600 of FIG. 6 includes stable, low-power datastore and/or a stable, low-power method of time keeping. Alternatively or in addition, the environmental sensor apparatus may include a mechanism for cancelling tasks that fail to successfully complete within a predetermined amount of time. Alternatively or in addition, the environmental sensor apparatus may be configured to perform a set of "default" fallback operations, in the event that other operations become unavailable or undesirable. Alternatively or in addition, the environmental sensor apparatus can be configured to receive remote schedule modifications and/or remote priority modifications. Alternatively or in addition, the environmental sensor apparatus can be configured to detect arbitrary signaling/stimuli as an "interrupt" that triggers one or more behavior modifications of the environmental sensor apparatus. Alternatively or in addition, the environmental sensor apparatus can be configured to impose timeouts on tasks that take too long to execute, limit data to predefined volumes, and/or prohibit infinite loops within tasks or between tasks that trigger each other.

The process 600 of FIG. 6 can be regarded as an advanced extension to the standard runtime loop based functionality of known IoT devices. It is readily understood in the context of a device that has a wake-work-sleep style of operation. Unlike with known IoT devices, the process 600 of FIG. 6 supports the ability to modify device and/or system behavior based on user defined preferences and/or offline environmental observations, as opposed to a static runtime loop that does not change. Moreover, one or more embodiments of the environmental sensor apparatus, as set forth herein, can receive stimuli through any of a variety of different networking interfaces. For example, at boot, the environmental sensor apparatus can check its locally stored "calendar" to determine a set of tasks to be performed during a next wake cycle. The foregoing procedure can be remotely revised (e.g., modifications can be input via a remote compute device and sent to the environmental sensor apparatus, where they are automatically implemented), and tasks that are scheduled can be defined to include one or more associated conditional "override" instructions. In some implementations, a default set of tasks can include one or more "fallback" tasks that have been designated as "safe" to perform, or as less computationally complex, or as compatible with a low-power operating mode. Alternatively or in addition, the default set of tasks can include one or more previously-executed sets of tasks and/or one or more user-preferred tasks. In other words, default tasks may be selected based on user-defined task preferences.

As discussed herein, in accordance with some embodiments, schedulable tasks can include, but are not limited to: powering on/off one or more specified IoT devices (e.g., sensors), collecting one or more predefined types of measurements from a specified one or more IoT devices, predefined measurement behaviors (e.g., sample sensor "A" for a time interval of t seconds beginning at time X and ending at time Y), updating firmware, checking a firmware status, caching data to disk, offloading or uploading cached data, checking global time, setting device time, querying a network for device configuration information (e.g., one or more user-defined schedules), checking for neighbor device notifications of critical events/alerts, determining whether a neighbor device notification of a critical event/alert triggers a schedule modification, etc.

In some implementations, an environmental sensor apparatus is configured to optimize IoT device tasking based on one or more predefined conditions and/or observed conditions. For example, if power is running low, then high power tasks may be prohibited. If a network is down for a known/predictable period of time each day, then the environmental sensor apparatus may be configured to avoid attempts to connect to the network during those time periods, and resume attempting to connect to the network later. The environmental sensor apparatus can also be configured to accommodate physical movement/relocation of the environmental sensor apparatus, for example by automatically checking the geolocation (e.g., using Global Positioning System (GPS) coordinates) often or at a predefined frequency. Conversely, environmental sensor apparatus can be configured not to check its geolocation if it not being physically moved (e.g., in response to detecting that the environmental sensor apparatus is stationary). Alternatively or in addition, the environmental sensor apparatus can be configured to detect an anomaly or a spike in a data point associated with an IoT device, where the IoT device and/or the data point has been designated as "critical," and in response to detecting the anomaly, the environmental sensor apparatus can generate and send (or cause to be sent) an alert message (warning) to one or more recipient (e.g., peer) compute devices. The environmental sensor apparatus can then continue its operation by sampling that IoT more frequently than it had previous to the anomaly, for example until the measured value returns to, or trends toward, a normal value.

Figure 7:
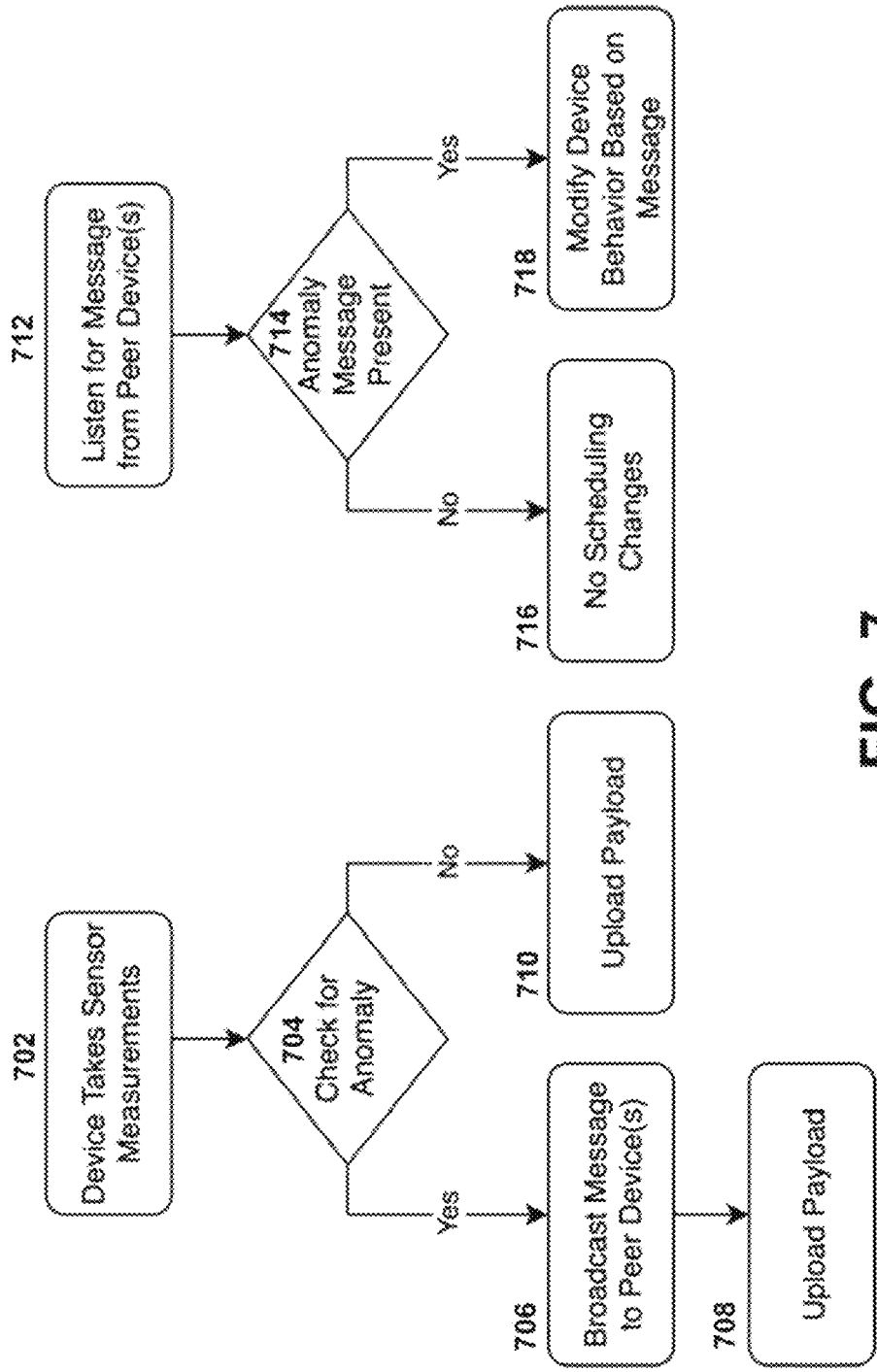
FIG. 7 shows flow diagrams for broadcasting and for responding to anomaly messages, according to some embodiments.

FIG. 7 shows flow diagrams for broadcasting anomaly messages, and for responding to anomaly messages from one or more neighbor/peer devices, according to some embodiments. The processes of FIG. 7 can be implemented, by way of example, by the environmental sensor apparatus 1300 of FIG. 13. As shown in FIG. 7, in a first scenario an environmental sensor apparatus detects an anomaly as follows: at 702, the environmental sensor apparatus takes/receives sensor measurement data (defining a "payload"), and at 704 checks for an anomaly in the sensor measurement data. If an anomaly is detected at 705, an alert message is broadcast to one or more peer devices at 706. The one or more peer devices can include one or more remote compute devices and/or one or more other environmental sensor apparatuses. If no anomaly is detected at 705, the payload is uploaded at 710 (e.g., to the one or more remote compute devices). As also shown in FIG. 7, in a second scenario an environmental sensor apparatus responds to a neighboring device (e.g., one or more other "peer" environmental sensor apparatuses) as follows: at 712, the environmental sensor apparatus listens for a message from the one or more peer devices, and at 714 determines whether an anomaly message is present/detected. If no anomaly message is present at 714, then no scheduling changes are applied in the environmental sensor apparatus at 716. If an anomaly message is present at 714, one or more device behaviors defined within the environmental sensor apparatus is modified, at 718, based on the anomaly message content.

The processes of FIG. 7 facilitate dynamic device functionality in that the environmental sensor apparatus can be responsive to environmental stimuli and/or to neighboring device's stimuli. Peer environmental sensor apparatuses can thus function as a "community" or "cluster," and "critical" priority measurements can be defined and processed. For example, high priority "trigger" events can be defined by one or more networked environmental sensor apparatuses, such that group behaviors can be implemented. Alternatively or in addition, the one or more networked environmental sensor apparatuses can define or receive priority indications for one or more IoT devices and/or for one or more measurement types, and preemptively (e.g., ahead of an existing schedule) measure high priority IoT devices. In some implementations, an environmental sensor apparatus implementing the processes of FIG. 7 includes a stable, low-power datastore and/or a stable, low-power method of time keeping. Alternatively or in addition, the environmental sensor apparatus may be configured to support a range of signaling priorities to convey to peers, support cooperative actions based on consensus or random assignment, such that subsets of a plurality of environmental sensor apparatuses can collectively function as a discrete cluster of devices, and support cluster-specific operating modes in which environmental sensor apparatuses within a cluster can convey status information directly to other environmental sensor apparatuses within the cluster, for group decision making and group actions. Alternatively or in addition, the environmental sensor apparatus can be configured to operate without a direct internet connection. Alternatively or in addition, the environmental sensor apparatus can retain its ability to make independent decisions, whether operating as a member of a cluster or not.

The processes of FIG. 7 facilitate a specialized use of networked environmental sensor apparatuses, and are applicable to mesh, star, tree, point-to-point, or hybrid network topologies in which devices can "assist" each other and make "community decisions" toward a predefined set of end goals. The "notification" behavior (e.g., steps 706 and 712-714 of FIG. 7) can be network interface agnostic, and can be implemented using local networking based on the physical locations of the environmental sensor apparatuses, or via an external network. Networked environmental sensor apparatuses can collect measurements individually, via their own onboard IoT devices, and can also make decisions based on local/peer environmental sensor apparatus conditions and notifications. For example, if one sensor within a network of environmental sensor apparatuses detects a "critical" contaminant, the associated environmental sensor apparatus (in which that sensor resides) can generate, and transmit to the other environmental sensor apparatuses, a notification indicating to the other environmental sensor apparatuses that a modification to their sleep cycles is recommended, such that those environmental sensor apparatuses "pay more attention to" (i.e., measure and/or analyze more frequently) the particular measurement type. A priority definition for a plurality of sensors, measurement types, environmental sensor apparatuses, etc., can be defined, for example, in terms of contaminant types, contaminant levels, contaminant presence detection (e.g., binary), device status (e.g., related to battery status, storage status, etc.), or to measurement levels more generally. Events/developments within a network of environmental sensor apparatuses (each environmental sensor apparatus of which can be referred to as a "node") can be tracked across a geographical area over time, and can serve as an "early warning system" for nearby devices. Notifications can be sent between environmental sensor apparatuses bidirectionally and in any order, as a scheme for conveying state changes. For example if environmental sensor apparatus "A" determines that a critical event has occurred or is beginning/occurring, environmental sensor apparatus A can notify environmental sensor apparatuses B, C, and D such that environmental sensor apparatuses B, C, and/or D can modify their behavior (e.g., operation of their own onboard sensors) accordingly. Similarly, environmental sensor apparatus A can notify environmental sensor apparatuses B, C, and D once a critical event is determined to have has ended, such that environmental sensor apparatuses B, C, and D can revert to their previous behavior or take other actions as predefined therein.

Figure 8:
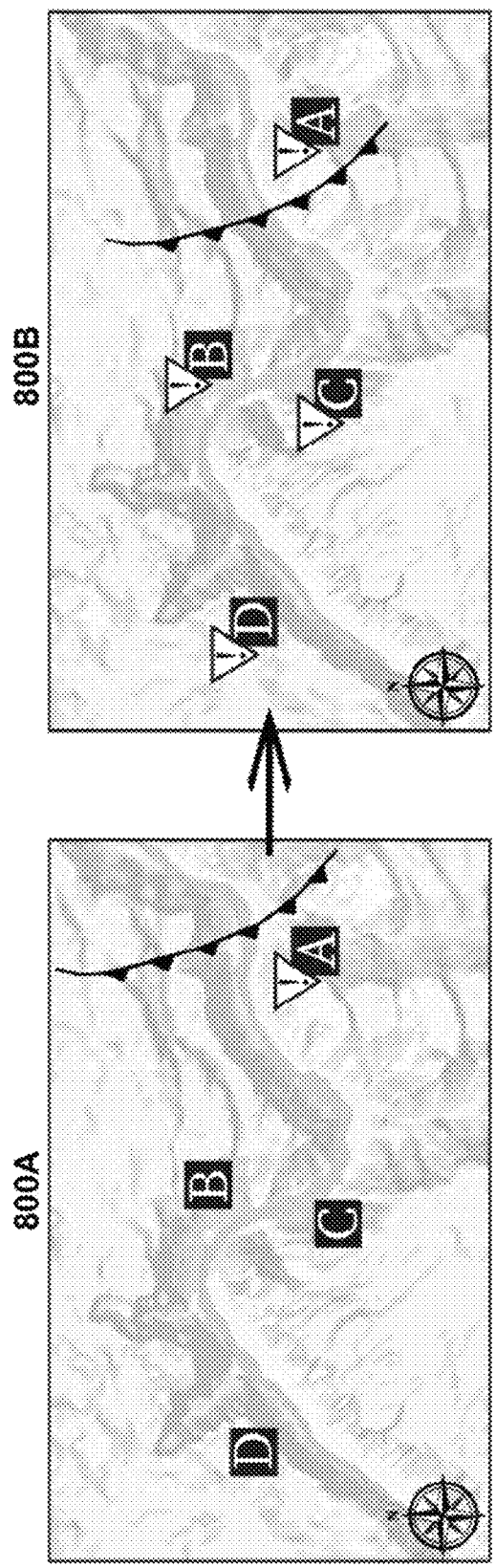
FIG. 8 is a graphical depiction of a functional instance of a process for dynamic IoT device behavior based on one or more neighboring peer devices, according to some embodiments.

FIG. 8 is a graphical depiction of the community behavior facilitated by the notification broadcasts of FIG. 7. More specifically, FIG. 8 is a graphical depiction of a functional instance of a process for dynamic IoT device behavior based on one or more neighboring peer devices, according to some embodiments. As shown in the left panel (800A) of FIG. 8, there are four networked environmental sensor apparatuses, A through D, and environmental sensor apparatus A is currently experiencing an alert (as indicated by the exclamation point). The right panel (800B) of FIG. 8 shows that each of the environmental sensor apparatuses A, B, C, and D is now aware of the alert (as indicated by the exclamation points), as a result of environmental sensor apparatus A sending a notification to each of environmental sensor apparatuses B, C, and D.

Figure 9:
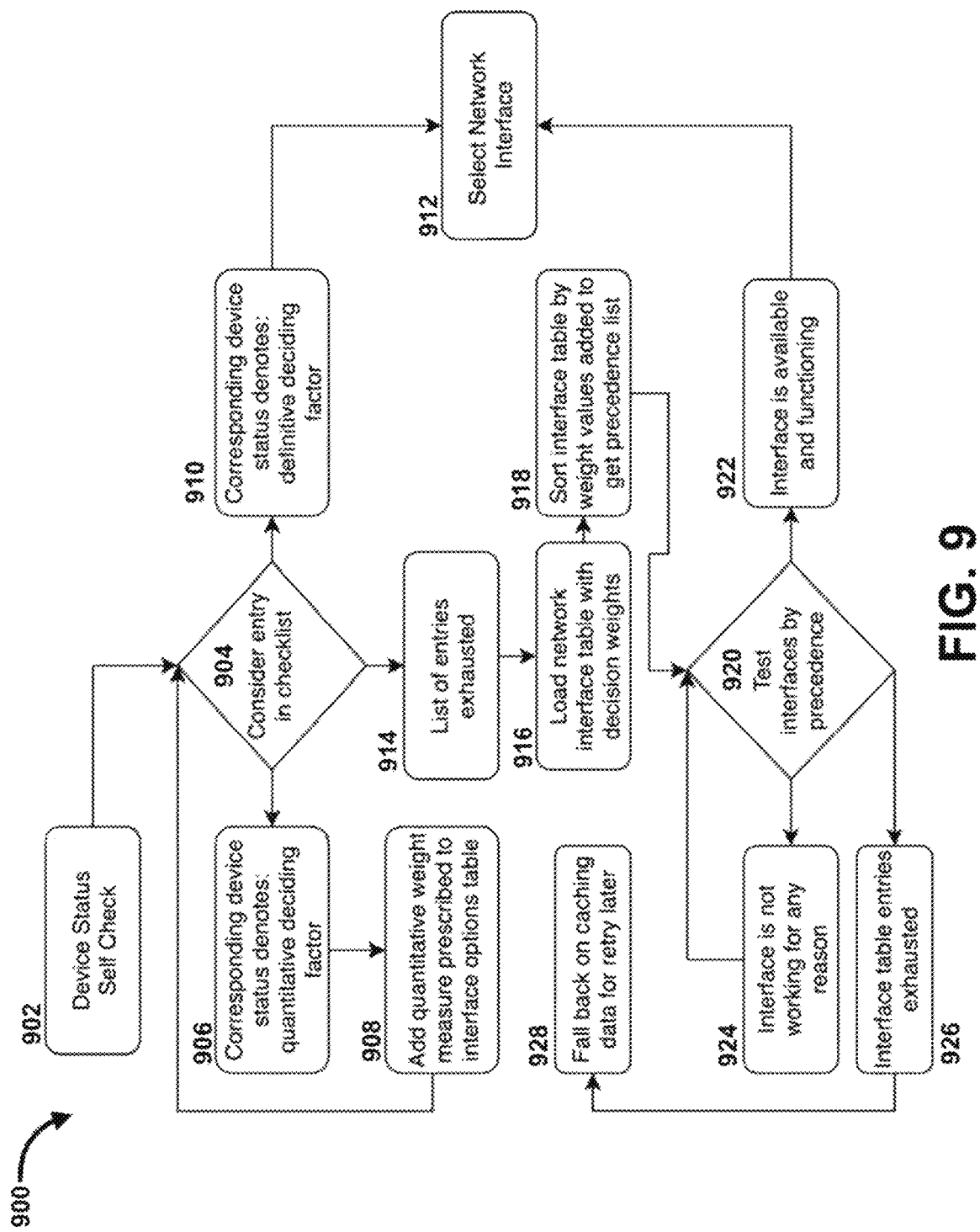
FIG. 9 is a flow diagram showing a network interface selection procedure, according to some embodiments.

FIG. 9 is a flow diagram showing a network interface selection procedure 900, for an IoT device based on interface availability and contextual stimuli, according to some embodiments. The procedure 900 can be implemented, by way of example, by the environmental sensor apparatus

Figure 13:
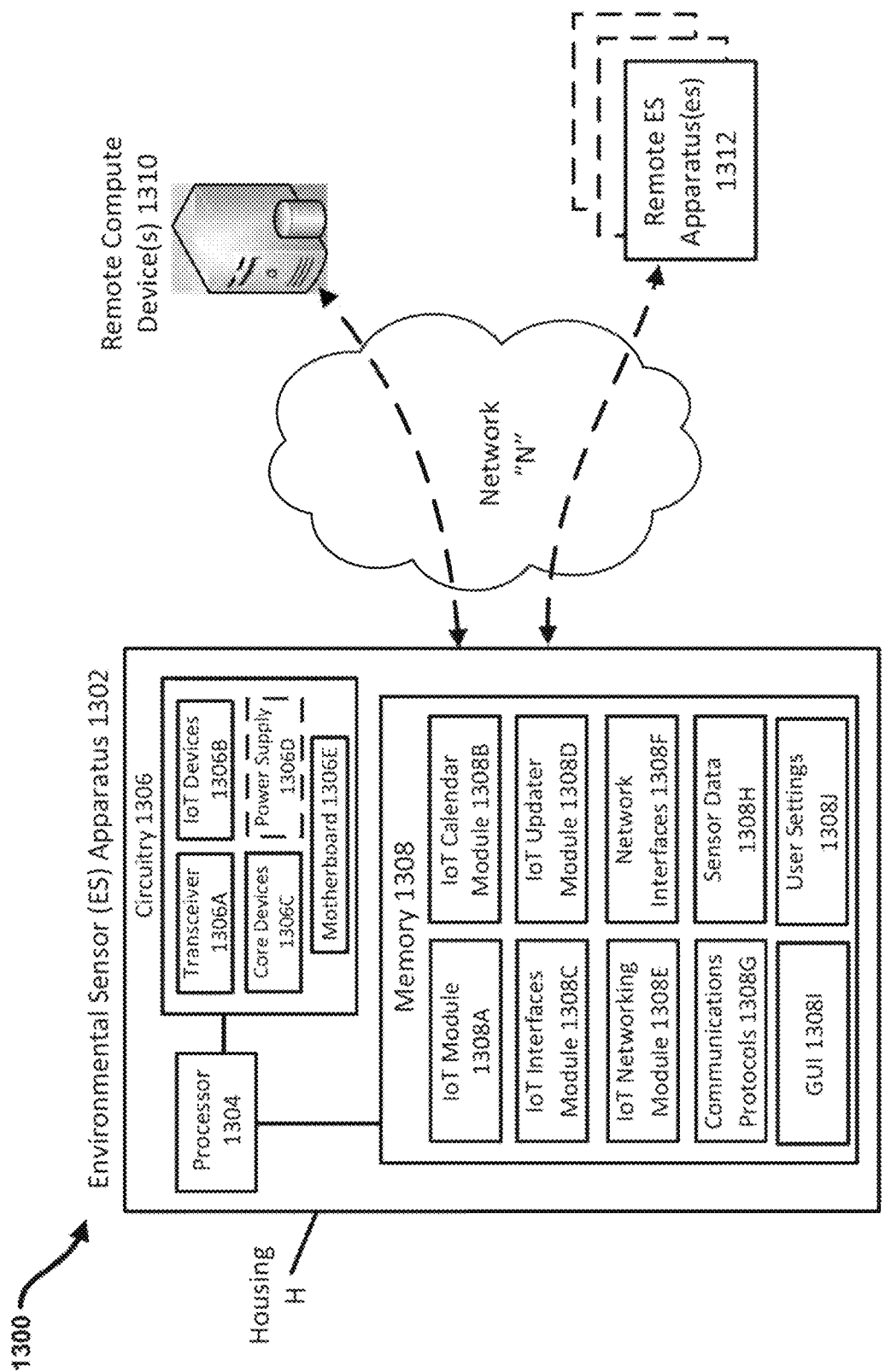
FIG. 13 is a system diagram for an environmental sensor apparatus, according to some embodiments.

1300 of FIG. 13. As shown in FIG. 9, the network interface selection procedure 900 begins at 902 with a device status self-check, to identify a device status for an IoT device. At 904, an entry (i.e., a specific network interface) in a checklist of network interfaces is considered, and if the device status determined at 902 denotes a definitive deciding factor (910), the network interface is selected at 912 and the network interface selection procedure 900 ends. Otherwise, at 906, the device status determined at 902 is deemed to denote a quantitative deciding factor is to be applied, and a quantitative weight measure ("decision weight") prescribed by the checklist entry is added to a network interface options table at 908, and the procedure moves to evaluation of the next entry in the checklist. The checklist of network interfaces can include one or more predefined decision factors and/or one or more weighting formulae, and can be stored separately (e.g., as a separate data structure) from the interface options table, which may be generated at a predefined frequency (e.g., one per iteration of the network interface selection procedure 900). Once the checklist entries have been exhausted (914), the network interface options table, which has been populated with decision weights, is loaded at 916 and sorted by the decision weight values at 918 to obtain a precedence list. Each network interface from the precedence list is then tested, in order of precedence at 920. If the network interface being considered is available and functioning, at 922, then that network interface is selected and the network interface selection procedure 900 ends. Alternatively, if the network interface being considered is not working for any reason at 924, the network interface selection procedure 900 loops back to 920 to test the next network interface in the order of precedence. If all network interfaces in the precedence list have been exhausted (i.e., tested and determined not to be working), the procedure proceeds to fall back on caching data so that communication from the IoT device can be retried later.

The network interface selection procedure 900 facilitates the intelligent selection of one or more network interfaces from among a plurality of different supported network interfaces, which can change over time and/or with application. As such, a "best of all worlds" approach is achieved by using the best features of each interface type when relevant (e.g., depending on bandwidth, throughput, power usage, range, cost, etc.), and optimizing user experience based on a variety of factors, which can include power usage/consumption, data offloading rate ("throughput"), offloading destination, network interfaces availability, etc.

In some implementations, an environmental sensor apparatus implementing the procedure 900 of FIG. 9 includes of the ability to select from among multiple network interfaces (note that one of the options can be "no interface"), based on predefined preferences/priority heuristics regarding the attributes of each network interface that are suitable for each of a plurality of different circumstances/scenarios.

The environmental sensor apparatus may be configured to support variation in the parameters of each individual network interface, and can include definitions of such variations as independent network interface types (e.g., high power radio WiFi mode, low power WiFi radio mode, high duty cycle radio, low duty cycle radio, etc.). In some implementations, source data formats are not changed based on the particular network interface being used. Rather, changes may be made within the network itself, the data link, and/or the physical communication layers of the network/protocol stack As discussed above, in some embodiments, each IoT device of an environmental sensor apparatus can select from multiple networking interfaces, based on what best suits a given application or configuration at a given time, and these selections can dynamically change over time (e.g., in response to newly detected conditions within a networked plurality of environmental sensor apparatuses, in response to user input, in response to detecting the addition or removal of an IoT device, etc.). The "best" networking interface can be determined based on contextual information such as use case, power availability, importance of data results, desired remote device (e.g., battery) lifespan, etc. Network interfaces can be ranked based on one or more quantitative decision factors, and/or explicit triggers can be defined and employed. As such, environmental sensor apparatuses of the present disclosure are highly adaptable to changing environments, network conditions, and user preferences.

Examples of network interfaces and associated decision factors can include:
  a. WiFi—high bandwidth, moderate range, moderate power, external/local infrastructure available
  b. Bluetooth—Moderate bandwidth, low range (local), low-moderate power
    i. Potential user/app device interactivity (e.g., for transferring data to user near device)
  c. LoRa (Long Range) radio—very low bandwidth, very high range, very low power, minimal or no external/local infrastructure available
  d. Cellular (4G, LTE, 5G, NB-IoT, etc.): moderate to high bandwidth, moderate range, relatively high power usage, external/local infrastructure available
  e. No interface. Storing/caching to local memory only.

Figure 10:
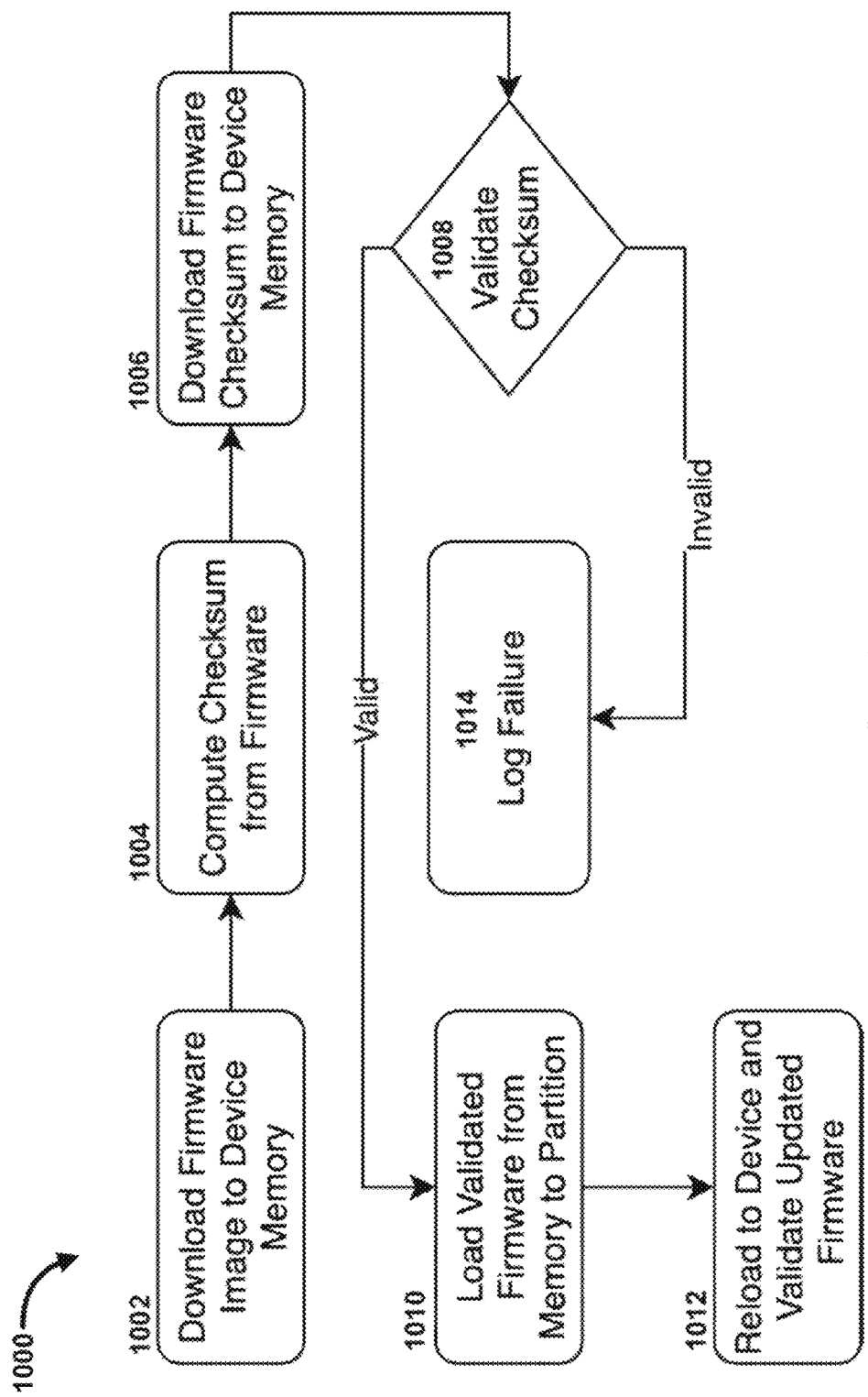
FIG. 10 is a flow diagram showing an in-memory over-the-air firmware download and flashing process, according to some embodiments.

The interface selection procedure discussed above can be invoked in various different circumstances, such as:
  a. At boot, before the selection of an operating mode
  b. Upon a network operation being requested
  c. Upon the failure of a different network interface
  d. Upon receipt/detection of one or more stimuli, such as:
    i. Critical power on battery
    ii. Removal of battery
    iii. Connection to constant power
    iv. Detection of motion
    v. User engagement (e.g., via a graphical user interface (GUI))
    vi. Physical interaction with the device FIG. 10 is a flow diagram showing an in-memory over-the-air firmware download/update and flashing process 1000, according to some embodiments. The process 1000 can be implemented, by way of example, by the environmental sensor apparatus 1300 of FIG. 13. As shown in FIG. 10, the in-memory over-the-air firmware download/update and flashing process 1000 includes downloading a firmware image to memory at 1002, and computing a checksum based on the firmware, at 1004. At 1006, the firmware checksum is downloaded to device memory, and a checksum validation is performed at 1008. If the checksum is not successfully validated (i.e., is invalid) at 1008, a failure is logged to memory at 1014. If the checksum is successfully validated (i.e., is valid) at 1008, the validated firmware is loaded from memory to a firmware disk partition at 1010, and at 1012, the updated firmware is reloaded to the environmental sensor apparatus and validated.

The in-memory over-the-air firmware download/update and flashing process 1000 of FIG. 10 is a hyper-efficient OTA method that maximizes speed and minimizes bandwidth, with minimal use of disk space on device. The process 1000 facilitates more efficient disk usage because file system data structures are not weighed down by disproportionately heavy files, and updates to applications are implemented faster than if they were written to an intermediate location on disk before the firmware space. The process 1000 also facilitates more efficient power usage due to fewer operations and less device uptime. The firmware space can thus function as a working space for applications and computations.

In some implementations, an environmental sensor apparatus implementing the process 1000 of FIG. 10 is capable of rewriting its own disk partitions, to verify firmware integrity (e.g., for completeness and accuracy), and/or to verify firmware origin (e.g., firmware creator). Alternatively or in addition, the environmental sensor apparatus may be configured to support indirect firmware image delivery through other network modes such as radio or Bluetooth®. The environmental sensor apparatus may be implemented in a manner that verifies all update files and/or their origins prior to applying them. Firmware updates may be delivered directly from an originator, and/or may be retransmitted and/or re-conveyed to the environmental sensor apparatus, as part of constructing a complete data set.

In some implementations, firmware images and their checksums are downloaded from the internet, and stored in the memory of the environmental sensor apparatus. The checksum can then be computed from the firmware that is stored in memory. As shown in FIG. 10, validation is performed by comparing a computed checksum with the checksum downloaded from the internet. If the validation succeeds, then the firmware is loaded from the memory to an upgrade partition on the environmental sensor apparatus. Otherwise, the firmware may be discarded and the rejection of the firmware may be logged. When the firmware is validated and loaded to the upgrade partition, the next boot of the environmental sensor apparatus uses the upgrade partition, and a further validation is performed to confirm that the flashing of the firmware was successful.

Figure 11:
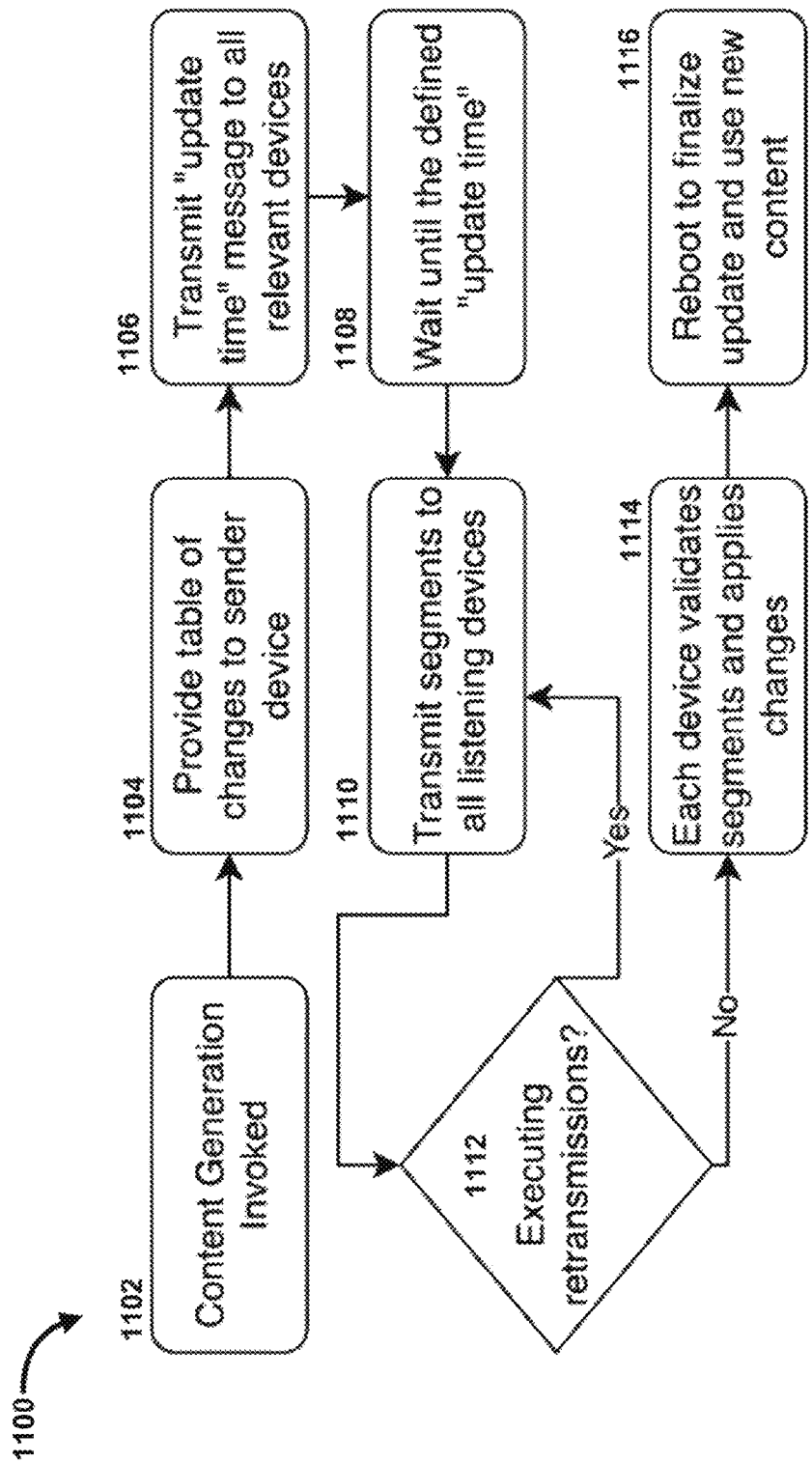
FIG. 11 is a flow diagram showing execution phases of a process for compression of over-the-air firmware updates on exceptionally highly constrained data networks, according to some embodiments.

FIG. 11 is a flow diagram showing execution phases of a process 1100 for compression of over-the-air firmware updates on exceptionally highly constrained data networks, according to some embodiments. The process 1100 can be implemented, by way of example, by the environmental sensor apparatus 1300 of FIG. 13. As shown in FIG. 11, the process 1100 includes invoking content generation at 1102, during with a firmware image is generated after building the associated source code. A table of changes is provided to a sender device at 1104. To generate the table of changes, bytewise comparisons can be performed based on previous firmware, for each block of storage, and block segments can be identified that have changes (optionally with compression of each set of changes as a unit). The block segments and their associated changes can be combined into the table of changes. An "update time" message is transmitted to all relevant environmental sensor apparatuses at 1106, when the update is available. The update message can be sent to each environmental sensor apparatus as they wake intermittently over a predefined time interval, until each environmental sensor apparatus has received the update message. The update message can include an indication of a network interface to listen on, a sending time, a time to listen, and/or a count of blocks to be updated. A dwell or wait elapses at 1108 until the defined update time. At 1110, segments of an update are transmitted to each of a plurality listening environmental sensor apparatuses. The update transmission can be performed block by block (optionally with multicast), to all listening environmental sensor apparatuses. At 1112, a determination is made as to whether any retransmissions should be executed (e.g., if one or more segments was missed). If so, the process 1100 loops back to step 1110 for retransmission of the segments. Otherwise, each environmental sensor apparatus validates its received segments at 1114 and applies the changes. For example, if the expected number of changes has been received and the checksums have been verified, the environmental sensor apparatus prepares to apply changes. For each received segment to update that the environmental sensor apparatus has collected, the environmental sensor apparatus writes each block of content to on-device bootable flash. A reboot is then performed at 1116, at each environmental sensor apparatus, to finalize the update and use the new content (i.e., resume normal running operation).

In some implementations, the process 1100 includes the use of multicast uplinks to conserve bandwidth, makes use of a block-based disk layout for content addressing and assignment, and/or coordinates the updating of batches of environmental sensor apparatuses within a given geographic or networked region concurrently or substantially simultaneously. Neighboring environmental sensor apparatuses can listen simultaneously, to share firmware bandwidth during an update. Verification of firmware integrity (e.g., completeness and accuracy) and/or of firmware origin (e.g., creator or distributor) can be included as part of the process 1100.

As discussed above, each environmental sensor apparatus can have the ability to rewrite its own disk partitions. Alternatively or in addition, each environmental sensor apparatus can include a network interface that supports the same data being delivered to multiple devices (e.g., internet protocol (IP) multicast or simple radio with multiple listeners/receivers). Alternatively or in addition, each environmental sensor apparatus can include a stable, low-power method of time keeping. Alternatively or in addition, the environmental sensor apparatus may be configured to perform peer to peer communication to aid in efficient transmission of minimal data and/or retransmission of missed segments.

The process 1100 of FIG. 11 can be network type agnostic, and can be supported by any data network with or without multicast functionalities. The process 1100 can be viewed as having three distinct phases: (1) content generation, which may occur once on the server side; (2) transmission, which may occur 1 to N times as multiple devices can listen and receive at once, and (3) the application of changes, which occurs once per environmental sensor apparatus, per firmware update.

Figure 12:
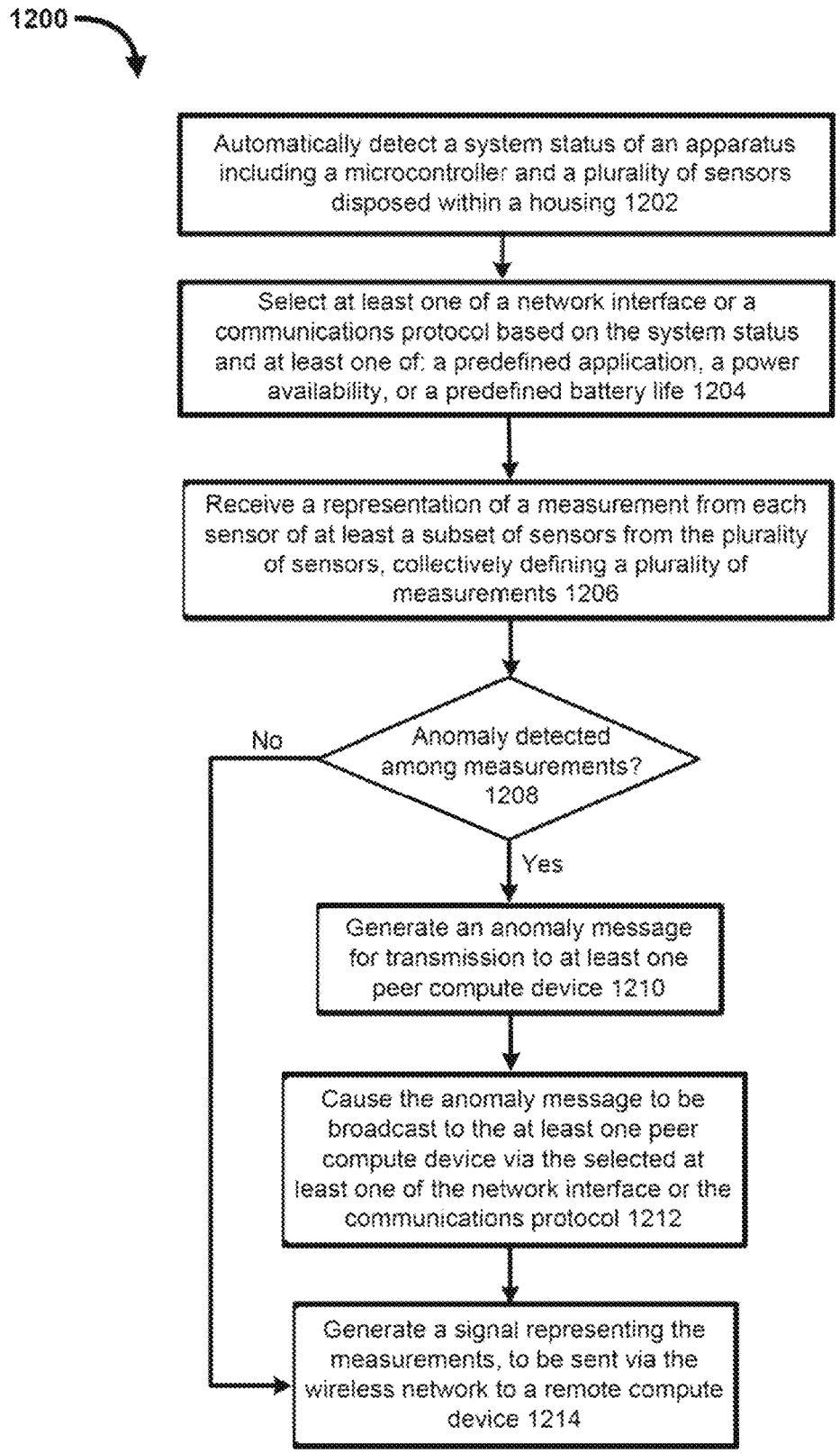
FIG. 12 is a flow diagram showing a method for anomaly detection and communication in an environmental sensor apparatus, according to some embodiments.

FIG. 12 is a flow diagram showing a method 1200 for anomaly detection and communication in an environmental sensor apparatus, according to some embodiments. The process 1200 can be implemented, by way of example, by the environmental sensor apparatus 1300 of FIG. 13. As shown in FIG. 12, the method 1200 includes automatically detecting, at 1202 and via a processor, a system status of an apparatus including a microcontroller and a plurality of sensors disposed within a housing At 1204, the processor selects at least one of (1) a network interface from a plurality of network interfaces, or (2) a communications protocol from a plurality of communications protocols, based on the system status and at least one of: a predefined application, a power availability, or a predefined battery life. A representation of a measurement is received via the processor, at 1206, from each sensor of at least a subset of sensors from the plurality of sensors, collectively defining a plurality of measurements. At 1208, a determination is made as to whether an anomaly has been detected, by the processor, among the plurality of measurements. If so, and in response to detecting the anomaly among the plurality of measurements, the processor generates a message indicating the anomaly ("anomaly message") at 1210, for transmission to at least one peer compute device, causes the message to be broadcast, at 1212, to the at least one peer compute device via the selected at least one of the network interface or the communications protocol, and generates a signal at 1214 representing the plurality of measurements to be sent, via a wireless network, to a remote compute device. If, at 1208, it is determined that an anomaly has not been detected, and in response to not detecting an anomaly among the plurality of measurements, the processor loops to generating the signal representing the plurality of measurements, at 1214, for sending via the wireless network to the remote compute device.

In some implementations, the selecting the network interface from the plurality of network interfaces is performed in response to at least one of: a system boot-up, a network operation, or detection of a failure of a network interface from the plurality of network interfaces.

In some implementations, the selecting the network interface from the plurality of network interfaces is performed in response to at least one of: an indication of a critical battery condition, detection of removal of the battery, detection of connection to an alternating current (AC) power source, detection of motion, detection of a physical interaction with the apparatus, or receipt of a user command.

FIG. 13 is a system diagram for an environmental sensor apparatus, according to some embodiments. As shown in FIG. 13, the system 1300 includes an environmental sensor apparatus 1302 that is optionally in communication via network "N" with one or more remote compute devices 1310 and/or one or more remote other environmental sensor apparatuses 1312. The network N can include a wireless communications network and/or a wired communications network. The environmental sensor apparatus 1302 includes a processor 1304 that is operably coupled to memory 1308 and to circuitry 1306. Each of the processor 1304, the memory 1308, and the circuitry 1306 is contained within, and physically protected by, a common housing "H" (e.g., enclosure 102 of FIG. 1). The circuitry 1306 includes a transceiver 1306A, IoT devices (e.g., including sensors) 1306B, core devices 1306C, a motherboard 1306E, and an optional power supply 1306D (e.g., a battery). The IoT devices 1306B can be readily removable from the environmental sensor apparatus 1302 (e.g., by virtue of an interface designed for device interchange) such that replacement IoT devices can be replaced, thereby making the environmental sensor apparatus 1302 "modular" or "extensible," as discussed herein. By contrast, the core devices 1306C may not be intended for replacement. In other words, the core devices 1306C may include sensors and/or other electronic devices that reside within the environmental sensor apparatus 1302 permanently. The transceiver 1306A can intermediate signals and messages passing between the environmental sensor apparatus 1302 and the one or more remote compute devices 1310 and/or the one or more remote environmental sensor apparatuses 1312. The memory 1308 stores processor executable instructions to perform a variety of functions and methods, such as those shown and described herein with reference to FIGS. 4-7 and 9-12. Such instructions are software instructions (or "code") that can be organized as "modules" (i.e., discrete software code or programs) as referenced herein. As shown in FIG. 13, the memory 1308 can store one or more of: an IoT module 1308A, an IoT calendar module 1308B, an IoT interfaces module 1308C, an IoT updater module 1308D, an IoT networking module 1308E, data associated with one or more network interfaces 1308F, data associated with one or more communications protocols 1308G, sensor data 1308H (e.g., historical sensor data, sensor operation rules and/or parameters, sensor detection thresholds, sensor alert levels, etc.), a graphical user interface (GUI) 1308I with which a user can interact to define data/parameters stored in the memory 1308 and/or to control operation of the environmental sensor apparatus 1302, and one or more user settings 1308J. Each of the one or more remote environmental sensor apparatuses 1312 can include some or all of the components of environmental sensor apparatus 1302, or may be similarly constructed.

Figure 14:
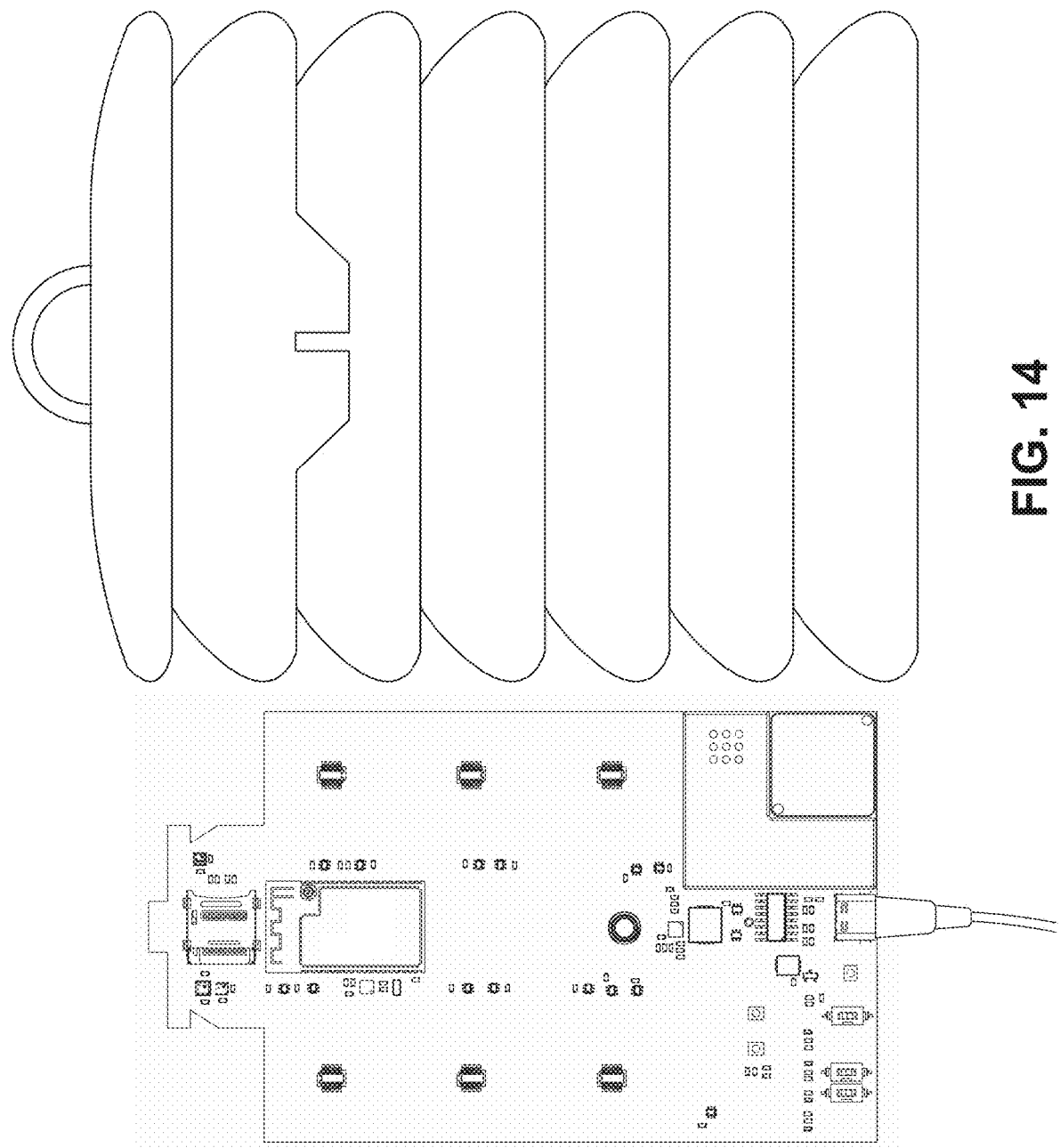
FIG. 14 is a photograph of an environmental sensor electronics assembly, including a motherboard (left) and enclosure/housing (right), according to some embodiments.
Figure 15B:
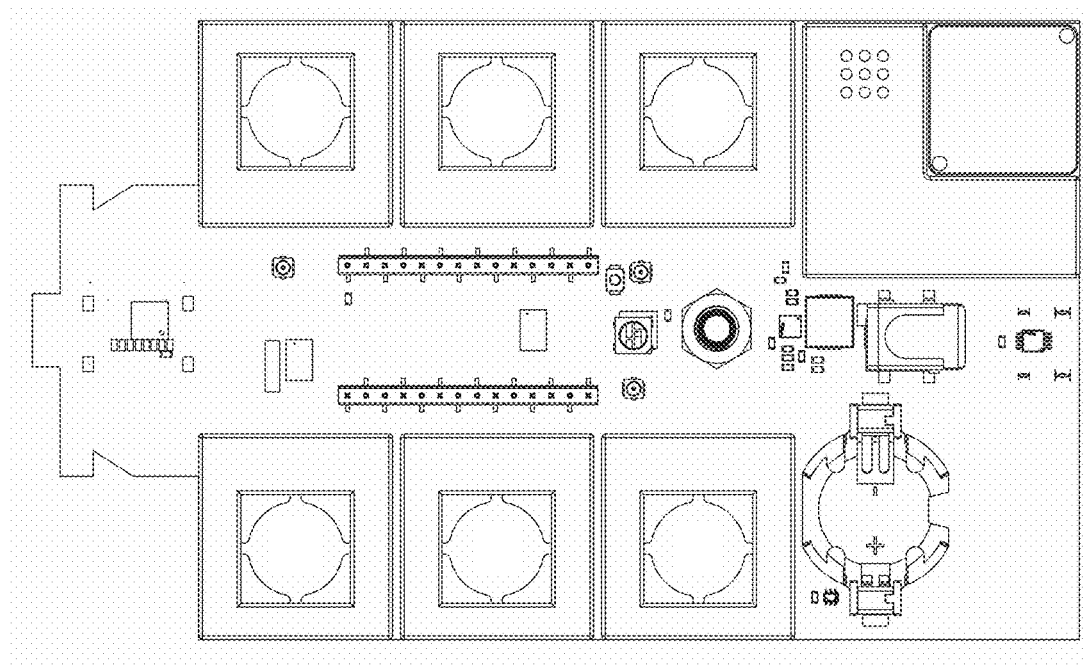
FIGS. 15A-15B are photographic rear views of the environmental sensor electronics assembly of FIG. 13, without and with sensor modules installed, respectively.
Figure 15A:
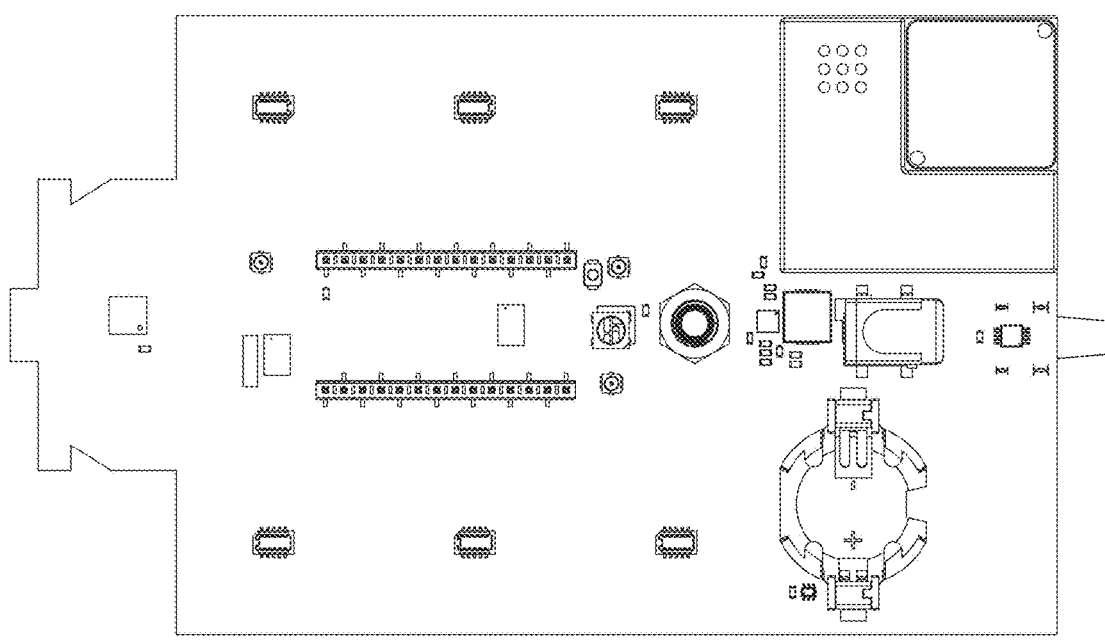
Figure 16B:
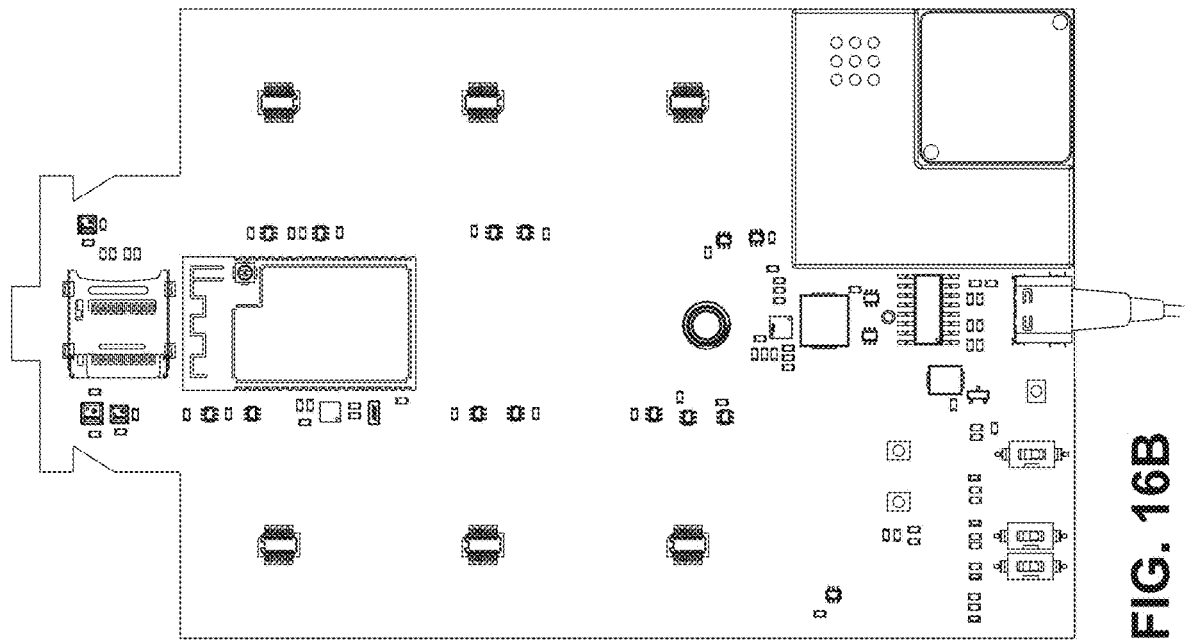
FIGS. 16A-16B are photographic front views of the environmental sensor electronics assembly of FIG. 14, each without sensor modules installed, with and without an expansion module installed, respectively.
Figure 16A:
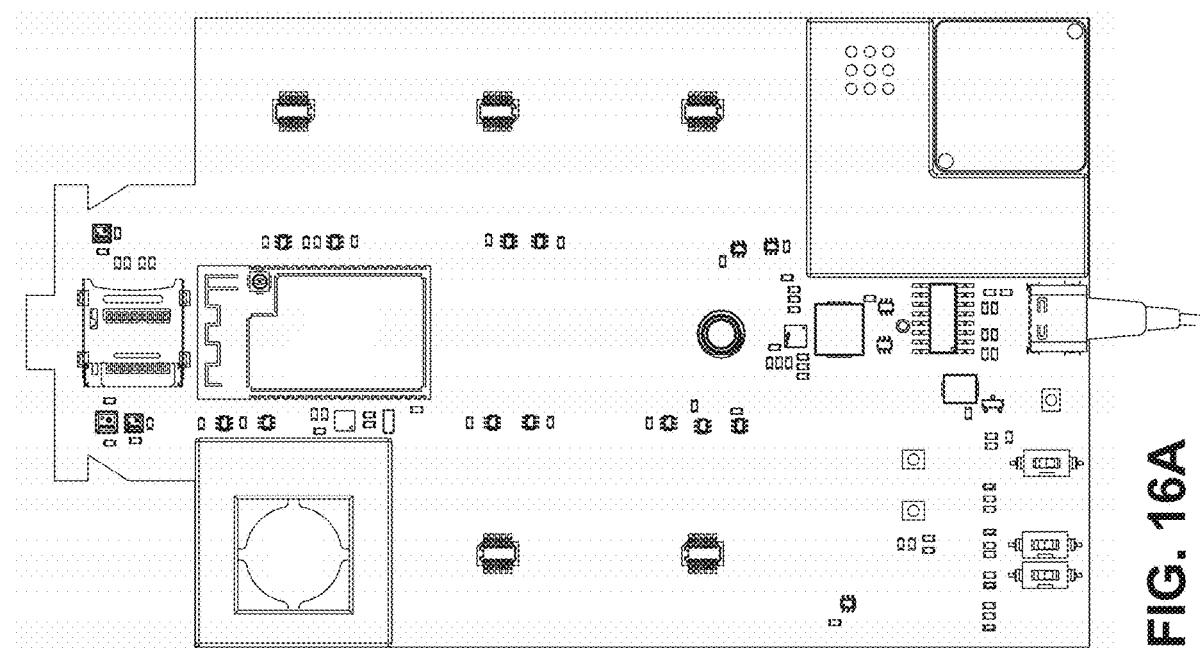
Figure 17:
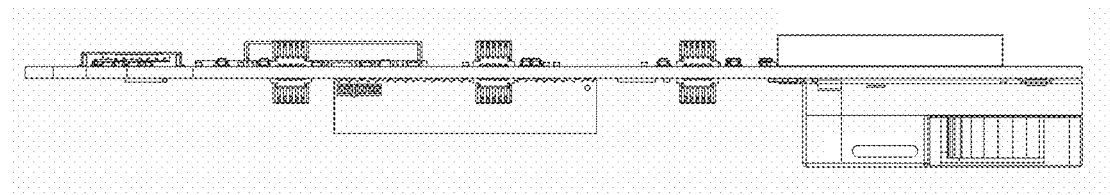
FIG. 17 is a photographic side view of the environmental sensor electronics assembly of FIG. 14, without sensor modules installed and with the expansion module installed.
Figure 16C:
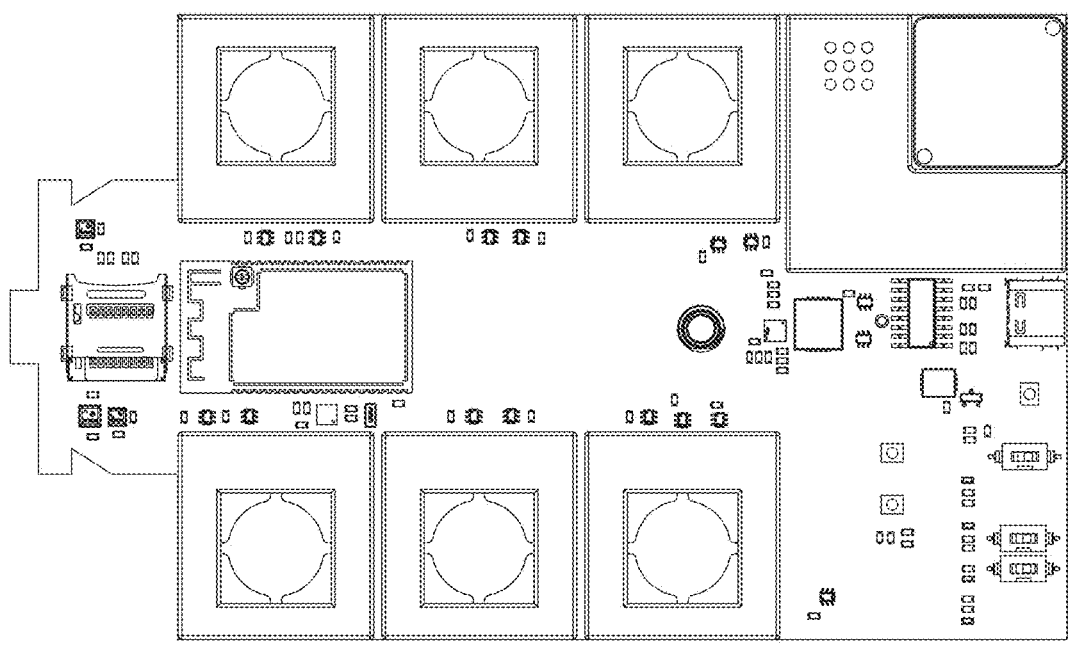
FIG. 16C is a photographic front view of the environmental sensor electronics assembly of FIG. 14, with sensor modules installed.

FIG. 14 is a photograph of an environmental sensor electronics assembly, including a motherboard (left) and enclosure/housing (right), according to some embodiments. FIGS. 15A-15B are photographic rear views of the environmental sensor electronics assembly of FIG. 14, without and with sensor modules installed, respectively. FIGS. 16A-16B are photographic front views of the environmental sensor electronics assembly of FIG. 14, each without sensor modules installed, with and without an expansion module installed, respectively. FIG. 16C is a photographic front view of the environmental sensor electronics assembly of FIG. 14, with sensor modules installed. FIG. 17 is a photographic side view of the environmental sensor electronics assembly of FIG. 14, without sensor modules installed and with the expansion module installed.

Figure 19:
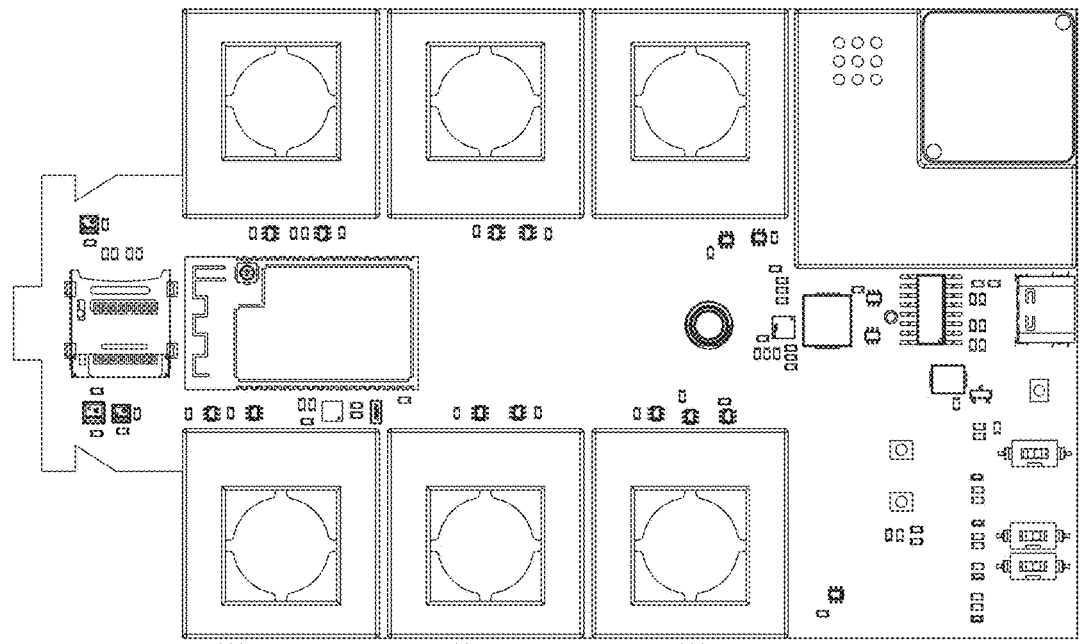
FIG. 19 is a photographic front view of the environmental sensor electronics assembly of FIG. 14, with sensor modules installed.
Figure 18:
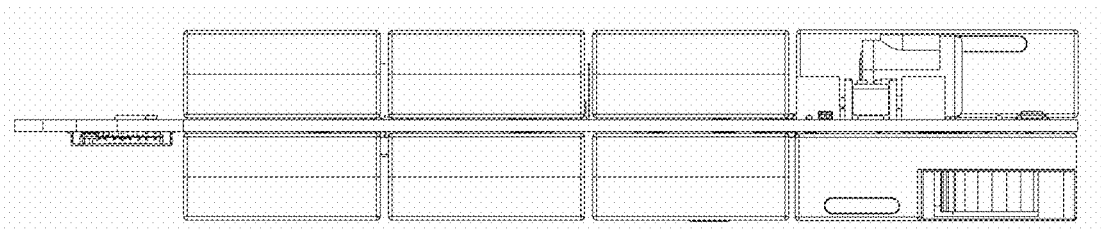
FIG. 18 is a photographic side view of the environmental sensor electronics assembly of FIG. 14, with sensor modules installed.
Figure 20:
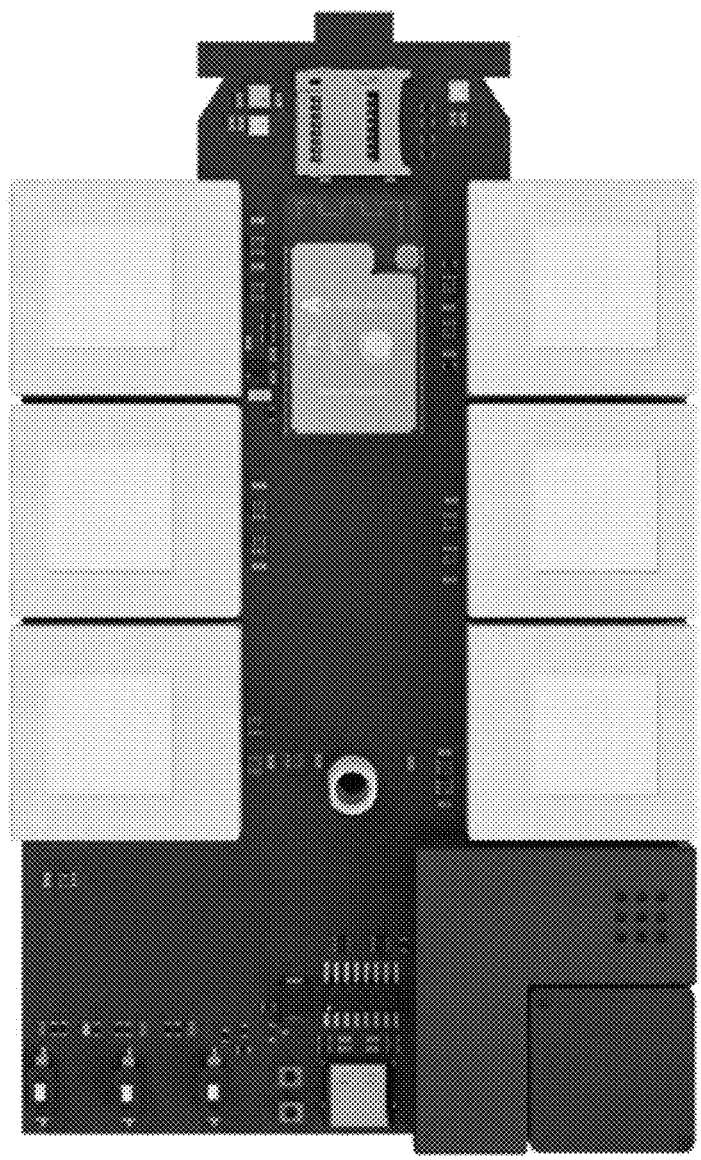
FIG. 20 is a photographic front view of an environmental sensor electronics assembly with sensor modules installed, according to some embodiments.
Figure 21:
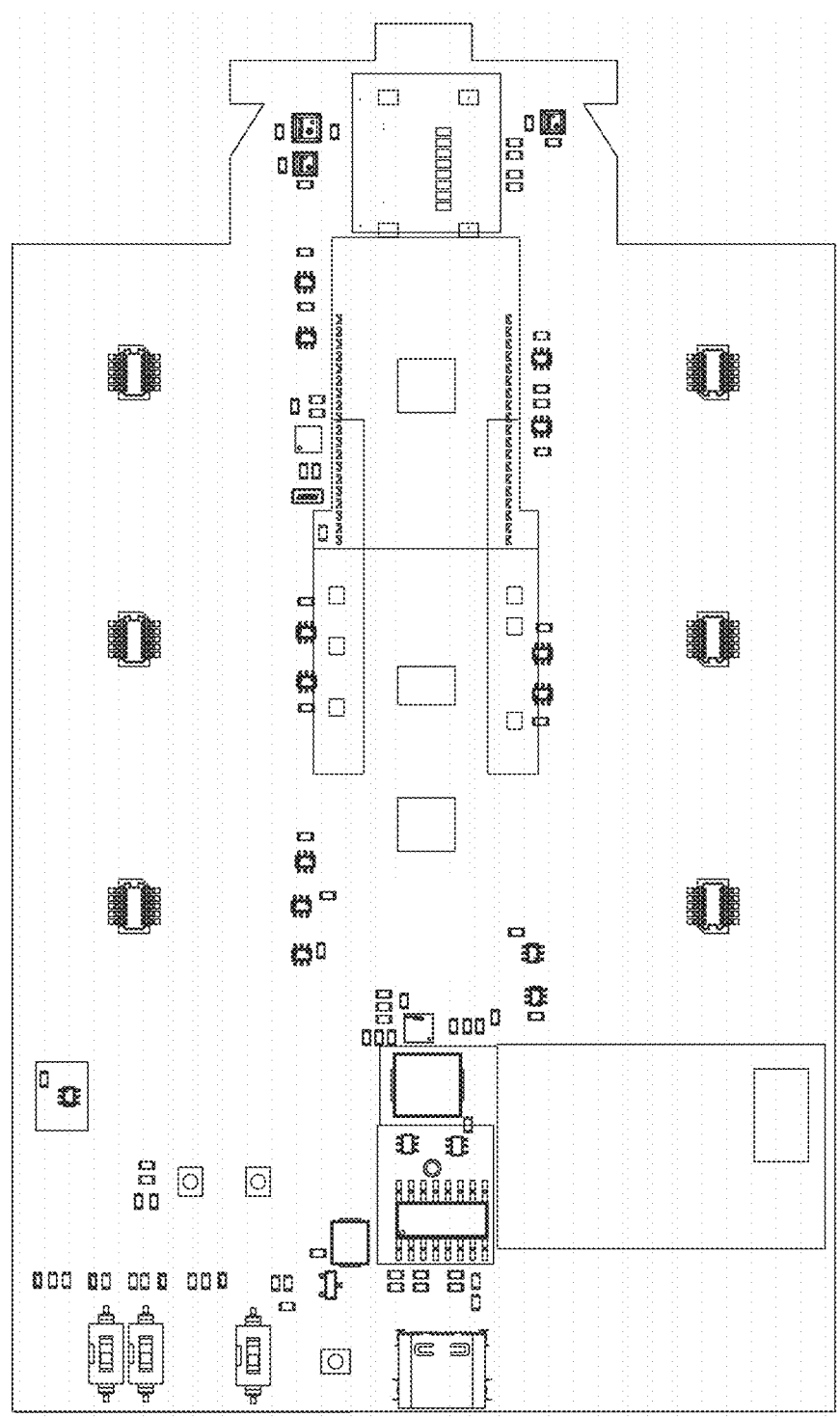
FIG. 21 is a schematic of an example motherboard for an environmental sensor electronics assembly, according to some embodiments.

FIG. 18 is a photographic side view of the environmental sensor electronics assembly of FIG. 14, with sensor modules installed. FIG. 19 is a photographic front view of the environmental sensor electronics assembly of FIG. 14, with sensor modules installed. FIG. 20 is a photographic front view of an environmental sensor electronics assembly with sensor modules installed, according to some embodiments. FIG. 21 is a schematic of an example motherboard for an environmental sensor electronics assembly, according to some embodiments.

Environmental sensor apparatuses of the present disclosure, in some embodiments, integrate hardware and software within a modular assembly that can accomplish a wide range of detection and networking functions, such that the environmental sensor apparatuses are suitable for use by environmentally conscious consumers as well as by professionals in scientific industries alike). The ability to "hot swap" sensors on the environmental sensor apparatus allows a unique level of customization for the consumer user, and permits the recommissioning of units (e.g., after their initial purpose has been served) by those in professional communities. For example, environmental sensor apparatuses that initially measured carbon monoxide levels may be retasked to an entirely different purpose, such as particulate matter (e.g., PM(1/2.5/5/10)) levels. Importantly, multiple sensors can be fitted at once, without imposing a maximum loadout. In other words, the environmental sensor apparatus can function with as many or few sensors as needed.

To further illustrate the benefits of the environmental sensor apparatus modularity/extensibility, if a given use case is near reliable power and network connectivity (for example, in an urban environment), a loadout permutation at hand (i.e., a configuration of an environmental sensor apparatus) may include the use of wall power for power and WiFi for network connectivity. The environmental sensor apparatuses may automatically operate in this configuration, in a "high performance" mode, with a high rate of refresh for sensors. In an opposing example, as environmental sensor apparatus located in a remote forested location may use battery-only power and long range communications. This environmental sensor apparatus would automatically operate in a "high efficiency" mode, with a lower sensor refresh rate and battery saving protocols in place. Any situation requiring either low-power or long range communication may use LoRa, a low-power wide area network protocol allowing devices to mesh with each other when no base nodal infrastructure is present, such as a building with WiFi. Low power, long range communication may be particularly suitable for researchers with multiple environmental sensor apparatuses, as only one visit to a central node may be needed to collect data for all environmental sensor apparatuses. The inclusion of LoRa, WiFi, and other network interfaces on each environmental sensor apparatus, along with preloaded environmental use case power configurations, allow for on-the-fly changes between low-power modes and high-power modes. This same functionality permits the physical expansion and functionality extension of the device with the addition/removal of new/different modules/IoT devices (e.g., sensors) of the environmental sensor apparatus over time.

Some environmental sensor apparatuses of the present disclosure are designed to operate across a wide range of temperatures, humidities, and weather conditions, for consistent functioning both indoors and outdoors, with and without available wall power. To incorporate these features, power, enclosure sealing, and ambient operational environments were considered. Computational Fluid Dynamics studies were performed on several louvered models to bound airflow requirements and accommodate the constraints of both direct (wall) power and battery power by minimizing fan power usage. In some implementations, GPS and sensor refresh rates can vary dynamically to accommodate different power draw maximums. Alternatively or in addition, enclosure sealing can be implemented as an entirely sealed device with the exception of a forced intake through the bottom of the enclosure, thereby protecting the internal components from direct exposure to the environment. PCB coatings can be selected based on expected or actual ambient operational environmental effects, such as residual moisture intake, to minimize risk of damage.

In some embodiments, an apparatus includes a housing enclosing a microcontroller and multiple sensors. The microcontroller includes a processor and a memory operatively coupled to the processor. The memory stores instructions that, when executed by the processor, cause the processor to automatically detect a system status of the apparatus and select at least one of a network interface from a set of network interfaces or a communications protocol from a set of communications protocols, based on the system status. The memory also stores instructions to cause the processor to receive a representation of a measurement from each sensor of at least a subset of sensors from the plurality of sensors, collectively defining a plurality of measurements. The memory also stores instructions to cause the processor to, in response to detecting an anomaly among the plurality of measurements: generate a message indicating the anomaly, for transmission to at least one peer compute device, cause the message to be broadcast to the at least one peer compute device via the selected at least one of the network interface or the communications protocol, and generate a signal representing the plurality of measurements to be sent, via a wireless network, to a remote compute device. The memory also stores instructions to cause the processor to, in response to not detecting an anomaly among the plurality of measurements, generate a signal representing the plurality of measurements to be sent, via the wireless network, to the remote compute device.

Battery power for the microcontroller and sensors is only one (optional/extra) configuration. The device can also be used with fixed power from an external DC power supply/AC-DC adapter. In such configurations, the only battery in use may be a small coin cell backup battery (e.g., for the real time clock).

If the network selected by the network selection procedure is LoRa or cellular instead of WiFi, a separate hardware interface may be used. However, the selection could also be between something like HTTP and MQTT (communications protocols that could have different preferences by system status), which can be used over various physical layer hardware interfaces. In this way, selection is between options comprised of both protocols and hardware interfaces. In some implementations, the selection is performed by/per measurement/originating-sensor. In other implementations, the same interface is selected for all measurements at a given time.

The destination described with "remote server" may refer, for example, to cloud hosting, and/or may refer to a peer compute device. For example, it may be determined, based on the system status, that no network interface provides a route to a particular recipient remote server (e.g., a cloud server), and as a result, a decision may be made to instead convey the measurements to a peer compute device which does have a route to the remote server.

The network selection for a message to peer devices is not necessarily the same as the one over which measurements are transmitted. They may be selected independently.

In some implementations, the plurality of network interfaces includes at least one of WiFi®, Bluetooth®, Long Range (LoRa) radio, or cellular.

In some implementations, the apparatus also includes a sensor interface disposed within the housing. The sensor interface can include a plurality of attachment ports, each sensor from the plurality of sensors being attached to an attachment port from the plurality of attachment ports of the sensor interface. Alternatively or in addition, the sensor interface can include a plurality of data lines, each data line from the plurality of data lines being configured for a different communications protocol from the plurality of communications protocols.

In some implementations, each communications protocol from the plurality of communications protocols is a serial communications protocol.

In some implementations, the plurality of communications protocols includes at least two of an Inter-Integrated Circuit (I2C) protocol, a Universal Asynchronous Receiver-Transmitter (UART) protocol, or a Serial Peripheral Interface (SPI) protocol.

In some implementations, the memory also stores instructions that, when executed by the processor, cause the processor to predict a time interval during which the wireless network will be offline, to cache the plurality of measurements at a first time preceding an end of the time interval, and to send the signal representing the plurality of measurements to the remote compute device at a second time after the time interval.

In some implementations, the memory also stores instructions that, when executed by the processor, cause the processor to wake at least one sensor from the plurality of sensors based on a calendar stored in the memory, prior to the receiving the representation of the measurement from the at least one sensor from the plurality of sensors. Alternatively or in addition, there can be circumstances where the processor determines, based on the calendar, that the tasking at hand is either "no tasks; just sleep again" or only a task(s) that is unrelated to sensing but instead internal maintenance and the like.

In some implementations, the memory also stores instructions that, when executed by the processor, cause the processor to receive, from the peer compute device, a signal representing a notification of a critical event, and to modify a scheduled task based on the notification of the critical event. The instructions to modify the scheduled task can include instructions to increase a priority of a specified sensor from the plurality of sensors such that the specified sensor is more frequently monitored.

In some implementations, the memory also stores instructions that, when executed by the processor, cause the processor to assign a priority, from a plurality of priorities, to each sensor from the at least a subset of sensors from the plurality of sensors, and to monitor activity of each sensor from the at least a subset of sensors from the plurality of sensors based on the plurality of priorities. Each priority from the plurality of priorities can be assigned based on at least one of: a contaminant level, a contaminant presence, a sensor status, or a measurement level.

In some implementations, the instructions to select the network interface from the plurality of network interfaces include instructions to select the network interface from the plurality of network interfaces further based on at least one of: a predefined application, a power availability, or a predefined battery life.

In some implementations, the instructions to select the network interface from the plurality of network interfaces include instructions to select the network interface from the plurality of network interfaces in response to at least one of: a system boot-up, a network operation, or detection of a failure of a network interface from the plurality of network interfaces.

In some implementations, the instructions to select the network interface from the plurality of network interfaces include instructions to select the network interface from the plurality of network interfaces in response to at least one of: an indication of a critical battery condition, detection of removal of the battery, detection of connection to an alternating current (AC) power source, detection of motion, detection of a physical interaction with the apparatus, or receipt of a user command.

In some implementations, the instructions to select the network interface from the plurality of network interfaces include instructions to sequentially evaluate each network interface from the plurality of network interfaces until a first acceptable network interface from the plurality of network interfaces is identified.

In some implementations, the memory also stores instructions that, when executed by the processor, cause the processor to receive a firmware update image from an originator, cause storage of the firmware update image in the memory, receive a checksum associated with the firmware update image, compute the checksum based on the firmware update image, and in response to successful validation of the computed checksum, load the firmware update image from the memory to an upgrade disk partition of the apparatus, and optionally signal or store an indication to utilize the upgraded partition (e.g., upon the next boot-up).

In some implementations, the memory also stores instructions that, when executed by the processor, cause the processor to send the signal representing the plurality of measurements, via the wireless network, to the remote compute device using a multicast uplink.

In some implementations, the memory also stores instructions that, when executed by the processor, cause the processor to receive a signal representing an update message, the update message including an indication of a network interface from the plurality of network interfaces, an identifier of a sender compute device, an indication of a listening time period, and a number of data blocks of a plurality of data blocks to be updated. The memory optionally further stores instructions that, when executed by the processor, cause the processor to receive each data block from the plurality of data blocks, during the listening time period, via one of: block-by-block transmission or multicast transmission.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of the present technology may be implemented using a combination of hardware, and software (or firmware). When implemented in firmware and/or software, the firmware and/or software code can be executed on any suitable processor or collection of logic components, whether provided in a single device or distributed among multiple devices.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The terms "substantially," "approximately," and "about" used throughout this Specification and the claims generally mean plus or minus 10% of the value stated, e.g., about 100 would include 90 to 110.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:
1. An apparatus, comprising:
a housing;
a microcontroller disposed within the housing, the microcontroller including a processor and a memory operatively coupled to the processor; and
a plurality of sensors disposed within the housing;
the memory storing instructions to cause the processor to:
automatically detect a system status of the apparatus,
select at least one of a network interface from a plurality of network interfaces or a communications protocol from a plurality of communications protocols, based on the system status,
receive a representation of a measurement from each sensor of at least a subset of sensors from the plurality of sensors, collectively defining a plurality of measurements, in response to detecting an anomaly among the plurality of measurements:
 generate a message indicating the anomaly, for transmission to at least one peer compute device;
 cause the message to be broadcast to the at least one peer compute device via the selected at least one of the network interface or the communications protocol; and
 generate a signal representing the plurality of measurements to be sent, via a wireless network, to a remote compute device, and
in response to not detecting an anomaly among the plurality of measurements:
 generate a signal representing the plurality of measurements to be sent, via the wireless network, to the remote compute device.

2. The apparatus of claim 1, wherein the plurality of network interfaces includes at least one of WiFi®, Bluetooth®, Long Range (LoRa) radio, or cellular.

3. The apparatus of claim 1, further comprising a sensor interface disposed within the housing, the sensor interface including a plurality of attachment ports, each sensor from the plurality of sensors being attached to an attachment port from the plurality of attachment ports of the sensor interface.

4. The apparatus of claim 1, further comprising a sensor interface disposed within the housing, the sensor interface including a plurality of data lines, each data line from the plurality of data lines being configured for a different communications protocol from the plurality of communications protocols.

5. The apparatus of claim 1, wherein each communications protocol from the plurality of communications protocols is a serial communications protocol.

6. The apparatus of claim 1, wherein the plurality of communications protocols includes at least two of an Inter-Integrated Circuit (I2C) protocol, a Universal Asynchronous Receiver-Transmitter (UART) protocol, or a Serial Peripheral Interface (SPI) protocol.

7. The apparatus of claim 1, wherein the memory further stores instructions to cause the processor to:
 predict a time interval during which the wireless network will be offline;
 cache the plurality of measurements at a first time preceding an end of the time interval; and
 send the signal representing the plurality of measurements to the remote compute device at a second time after the time interval.

8. The apparatus of claim 1, wherein the memory further stores instructions to cause the processor to wake at least one sensor from the plurality of sensors based on a calendar stored in the memory, prior to the receiving the representation of the measurement from the at least one sensor from the plurality of sensors.

9. The apparatus of claim 1, wherein the memory further stores instructions to cause the processor to:
 receive, from the peer compute device, a signal representing a notification of a critical event; and
 modify a scheduled task based on the notification of the critical event.

10. The apparatus of claim 9, wherein the instructions to modify the scheduled task include instructions to increase a priority of a specified sensor from the plurality of sensors such that the specified sensor is more frequently monitored.

11. The apparatus of claim 1, wherein the memory further stores instructions to cause the processor to:
 assign a priority, from a plurality of priorities, to each sensor from the at least a subset of sensors from the plurality of sensors, each priority from the plurality of priorities being assigned based on at least one of: a contaminant level, a contaminant presence, a sensor status, or a measurement level; and
 monitor activity of each sensor from the at least a subset of sensors from the plurality of sensors based on the plurality of priorities.

12. The apparatus of claim 1, wherein the instructions to select the network interface from the plurality of network interfaces include instructions to select the network interface from the plurality of network interfaces further based on at least one of: a predefined application, a power availability, or a predefined battery life.

13. The apparatus of claim 1, wherein the instructions to select the network interface from the plurality of network interfaces include instructions to select the network interface from the plurality of network interfaces in response to at least one of: a system boot-up, a network operation, or detection of a failure of a network interface from the plurality of network interfaces.

14. The apparatus of claim 1, wherein the instructions to select the network interface from the plurality of network interfaces include instructions to select the network interface from the plurality of network interfaces in response to at least one of: an indication of a critical battery condition, detection of removal of the battery, detection of connection to an alternating current (AC) power source, detection of motion, detection of a physical interaction with the apparatus, or receipt of a user command.

15. The apparatus of claim 1, wherein the instructions to select the network interface from the plurality of network interfaces include instructions to sequentially evaluate each network interface from the plurality of network interfaces until a first acceptable network interface from the plurality of network interfaces is identified.

16. The apparatus of claim 1, wherein the memory further stores instructions to cause the processor to:
 receive a firmware update image from an originator;
 cause storage of the firmware update image in the memory;
 receive a checksum associated with the firmware update image;
 compute the checksum based on the firmware update image;
 in response to successful validation of the computed checksum, load the firmware update image from the memory to an upgrade disk partition of the apparatus.

17. The apparatus of claim 1, wherein the memory further stores instructions to cause the processor to:
 send the signal representing the plurality of measurements, via the wireless network, to the remote compute device using a multicast uplink.

18. The apparatus of claim 1, wherein the memory further stores instructions to cause the processor to:
 receive a signal representing an update message, the update message including an indication of a network interface from the plurality of network interfaces, an identifier of a sender compute device, an indication of a listening time period, and a number of data blocks of a plurality of data blocks to be updated.

19. The apparatus of claim 18, wherein the memory further stores instructions to cause the processor to:
 receive each data block from the plurality of data blocks, during the listening time period, via one of: block-by-block transmission or multicast transmission.

20. A method, comprising:
automatically detecting, via a processor, a system status of an apparatus including a microcontroller and a plurality of sensors disposed within a housing,
selecting, via the processor, at least one of a network interface from a plurality of network interfaces or a communications protocol from a plurality of communications protocols, based on the system status and at least one of: a predefined application, a power availability, or a predefined battery life,
receiving, via the processor, a representation of a measurement from each sensor of at least a subset of sensors from the plurality of sensors, collectively defining a plurality of measurements,
in response to detecting an anomaly among the plurality of measurements:
  generating, via the processor, a message indicating the anomaly, for transmission to at least one peer compute device;
  causing the message to be broadcast to the at least one peer compute device via the selected at least one of the network interface or the communications protocol; and
  generating, via the processor, a signal representing the plurality of measurements to be sent, via a wireless network, to a remote compute device, and
in response to not detecting an anomaly among the plurality of measurements:
  generating, via the processor, a signal representing the plurality of measurements to be sent, via the wireless network, to the remote compute device.

21. The method of claim 20, wherein the selecting the network interface from the plurality of network interfaces is performed in response to at least one of: a system boot-up, a network operation, or detection of a failure of a network interface from the plurality of network interfaces.

22. The method of claim 20, wherein the selecting the network interface from the plurality of network interfaces is performed in response to at least one of: an indication of a critical battery condition, detection of removal of the battery, detection of connection to an alternating current (AC) power source, detection of motion, detection of a physical interaction with the apparatus, or receipt of a user command.

* * * * *